(12) United States Patent
Nishijima

(10) Patent No.: US 10,576,562 B1
(45) Date of Patent: Mar. 3, 2020

(54) CIRCULAR SAW CUTTING MACHINE

(71) Applicant: NISHIJIMA KABUSHIKI KAISHA, Toyohashi-shi, Aichi (JP)

(72) Inventor: Yutaka Nishijima, Toyohashi (JP)

(73) Assignee: NISHIJIMA KABUSHIKI KAISHA (JP)

( * ) Notice: Subject to any disclaimer, the term of this patent is extended or adjusted under 35 U.S.C. 154(b) by 0 days.

(21) Appl. No.: 16/114,334

(22) Filed: Aug. 28, 2018

(51) Int. Cl.
| | |
|---|---|
| *B27B 3/36* | (2006.01) |
| *B23D 61/10* | (2006.01) |
| *B23Q 3/155* | (2006.01) |
| *B27B 5/34* | (2006.01) |
| *B23Q 3/10* | (2006.01) |
| *B23Q 3/00* | (2006.01) |

(52) U.S. Cl.
CPC ............. *B23D 61/10* (2013.01); *B23Q 3/005* (2013.01); *B23Q 3/105* (2013.01); *B23Q 3/155* (2013.01); *B27B 5/34* (2013.01)

(58) Field of Classification Search
CPC ........ B23D 61/10; B23Q 3/005; B23Q 3/105; B23Q 3/155; B27B 5/34
See application file for complete search history.

(56) References Cited

U.S. PATENT DOCUMENTS

| | | | | |
|---|---|---|---|---|
| 7,281,535 B2* | 10/2007 | Mihai | ....................... | B27B 5/34 125/13.01 |
| 8,371,567 B2* | 2/2013 | Angelov | ............... | H01L 21/683 156/345.52 |
| 8,851,463 B2* | 10/2014 | Angelov | ............... | H01L 21/683 156/52 |
| 2003/0000717 A1* | 1/2003 | Hofmann | ............. | B23D 45/165 173/216 |
| 2005/0268899 A1* | 12/2005 | Mihia | ........................ | B27B 5/34 125/13.01 |
| 2006/0162520 A1* | 7/2006 | Blum | .................... | B23D 45/105 83/425.4 |
| 2007/0175304 A1* | 8/2007 | In't Veld | .................... | B27B 5/34 83/169 |
| 2017/0232634 A1* | 8/2017 | Stroud | ................. | B23D 59/025 83/829 |

(Continued)

FOREIGN PATENT DOCUMENTS

| | | |
|---|---|---|
| JP | 0751928 A | 2/1995 |
| JP | 5148300 B2 | 12/2012 |
| JP | 3184571 U | 7/2013 |

(Continued)

*Primary Examiner* — Omar Flores Sanchez
(74) *Attorney, Agent, or Firm* — Jordan and Koda, PLLC

(57) ABSTRACT

A circular saw cutting machine (1) includes a machine main body (10), an articulated robot (60), and a cutter stocker (70). A circular saw (5) is secured and interposed by a cutter clamp cylinder (CYL21) between a front end face (32) of the main spindle (21) and a cutter presser piece (50) with pins (33, 51) inserted in pin insertion holes (5*b*). When removing the circular saw (5), a hydraulic is switched over to cause the cutter clamp cylinder (CYL21) to perform unclamping so that the cutter presser piece (50) can be pulled out of the main spindle (21). When the articulated robot (60) performs cutter change, a main spindle motor (M10) and a brake (25) are controlled based on the rotation angle detected by a spindle stop position sensor (SE10) to stop the main spindle (21) in a predetermined home angle condition.

9 Claims, 15 Drawing Sheets

(56) References Cited

U.S. PATENT DOCUMENTS

2019/0093314 A1* 3/2019 Nilsson ............... B23D 61/026

FOREIGN PATENT DOCUMENTS

| JP | 2013-248672 A | 12/2013 |
|----|---------------|---------|
| JP | 2016530108 A | 9/2016 |
| JP | 6270297 B1 | 1/2018 |
| JP | 2018-108631 A | 7/2018 |

* cited by examiner (A) Cut To Predetermined Length
FIG. 11a
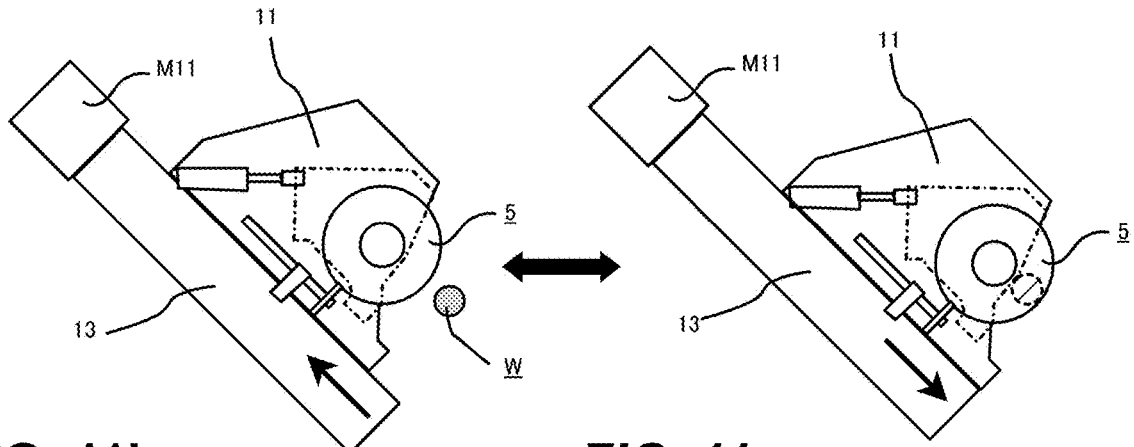
FIG. 11b
(B) Transfer To Cutter Change Position
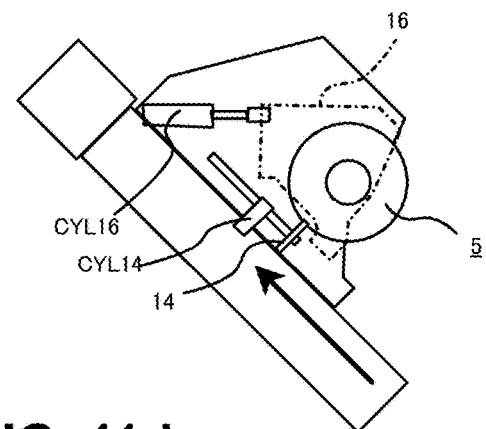
FIG. 11c
(C) Release Presser Lid And Retract The Brush
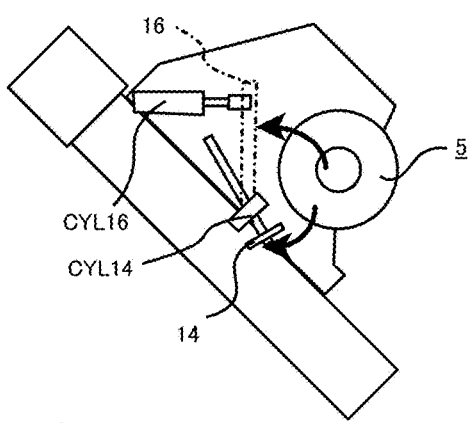
FIG. 11d
(D) Blow Air To Pad Presser
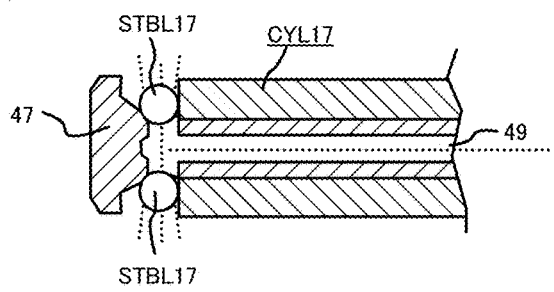
FIG. 11e
(E) Blow Air To Cutter Presser
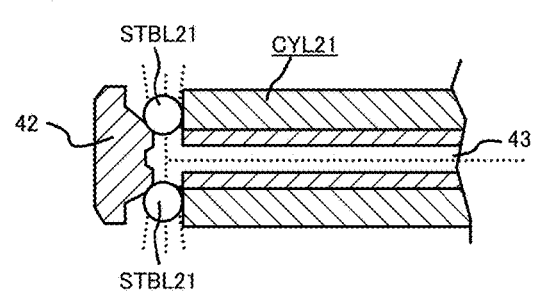
(F) Main Spindle Home Stop
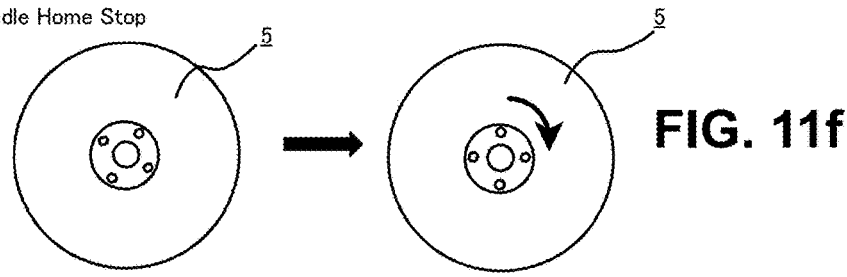
FIG. 11f (A) Teaching Actions 01 (Prepare To Blow Air Inside Case)

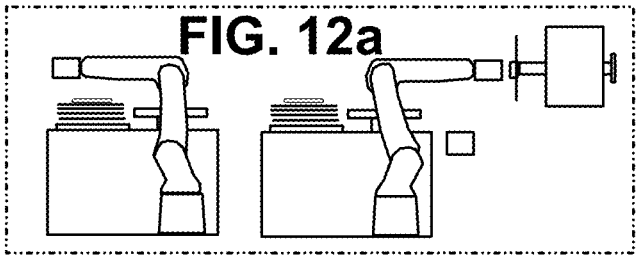

FIG. 12a (B) Teaching Actions 02 (Blow Air)

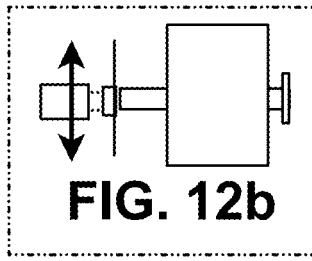

FIG. 12b (C) Teaching Actions 03 (Adhere To Cutter Presser, Main Spindle 21 → Mount 2)

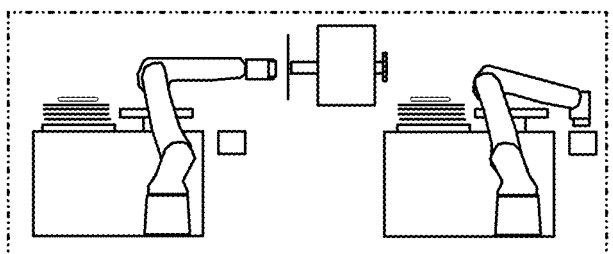

FIG. 12c (D) Teaching Actions 04 (Mount 2 → Main Spindle 21)

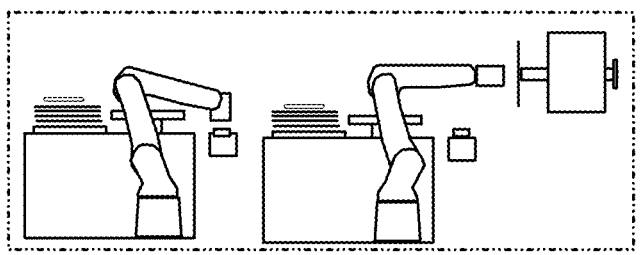

FIG. 12d (E) Teaching Actions 05 (Adhere To Cutter, Remove)

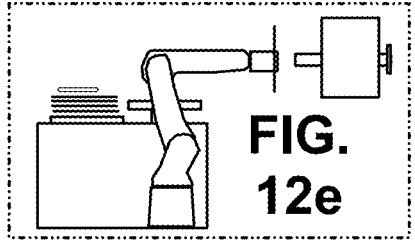

FIG. 12e (F) Teaching Actions 06 (Blow Air)

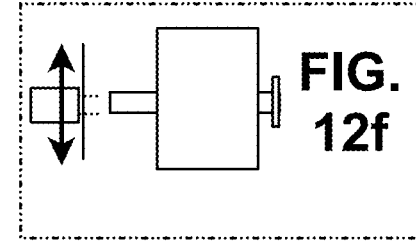

FIG. 12f (G) Teaching Actions 07 (Main Spindle 21 → Mount 72)

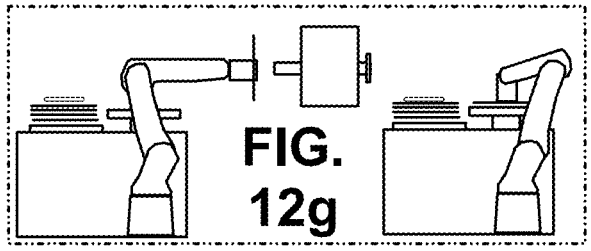

FIG. 12g (H) Teaching Actions 08 (Mount 72 → Mount 71)

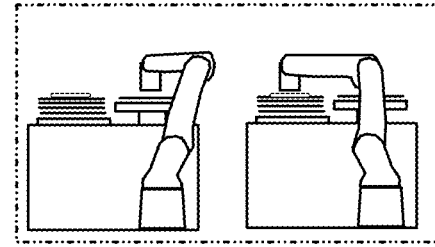

FIG. 12h (I) Teaching Actions 09 (Adhere To Spacer → Mount 72)

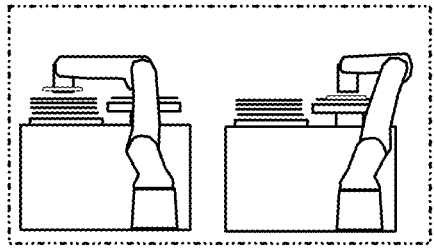

FIG. 12i (A) Teaching Actions 10 (Mount 72 → Mount 71)
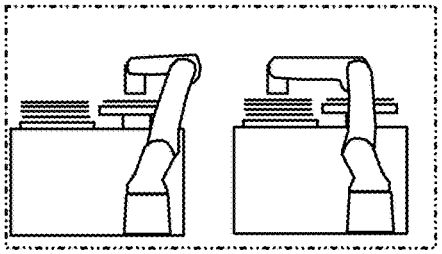
FIG. 13a
(B) Teaching Actions 11 (Adhere To Cutter → Main Spindle 21)
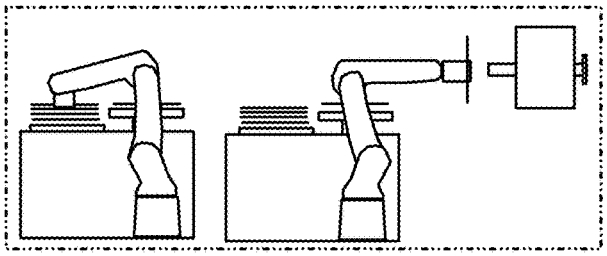
FIG. 13b
(C) Teaching Actions 12 (Main Spindle 21 → Mount 2)
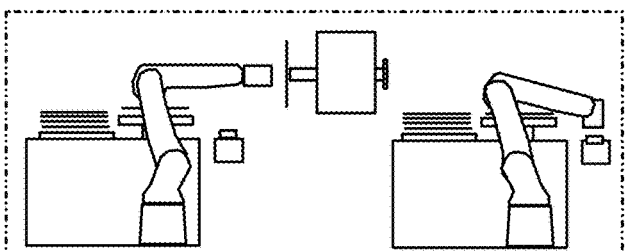
FIG. 13c
(D) Teaching Actions 13 (Adhere → Main Spindle 21)
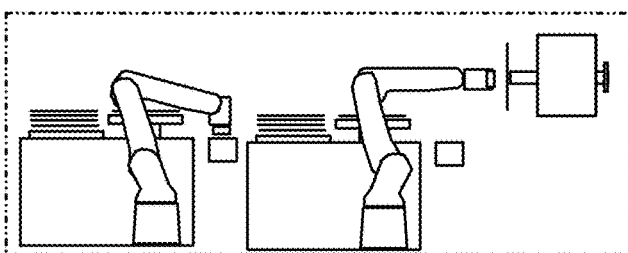
FIG. 13d
(E) Teaching Actions 14 (Mount Cutter Presser → Measuring Position)
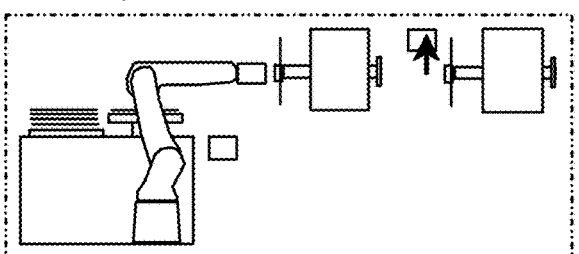
FIG. 13e
FIG. 13g
(F) Measure Wobble
(G) Teaching Actions 15 (Return To Initial Position)
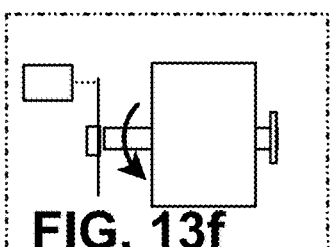
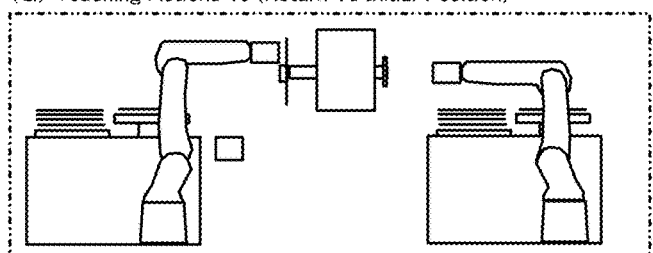
FIG. 13f

FIG. 14a (A) Teaching Actions 16 (Measuring Position → Main Spindle 21)  (B) Teaching Actions 03 - 04
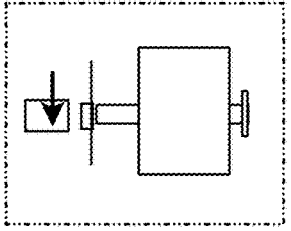
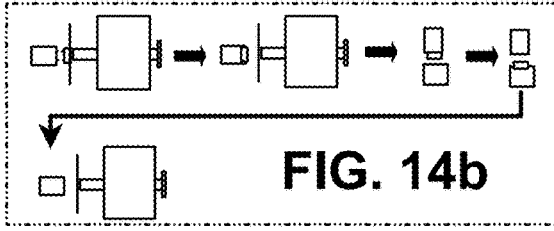
FIG. 14b
FIG. 14c (C) Teaching Actions 17 Adhere To Cutter Presser → Mount 71)
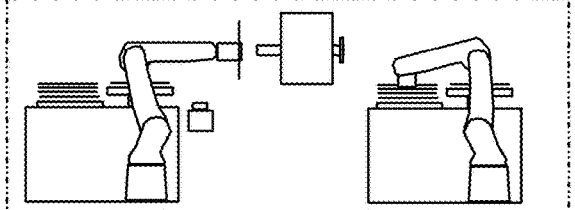
FIG. 14d (D) Teaching Actions 18 (Mount 71 → Main Spindle 21)  (E) Teaching Actions 19 (Blow Air)
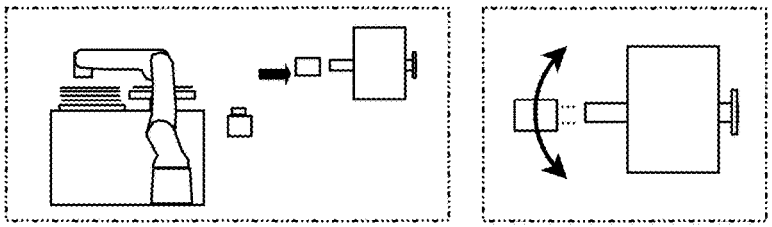
FIG. 14f (F) Teaching Actions 20 (Main Spindle 21 → Mount 71)
FIG. 14e
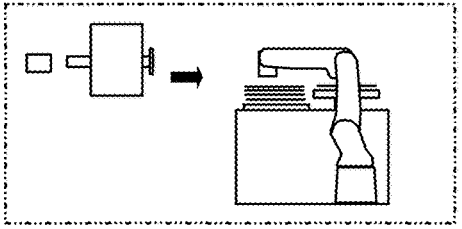
FIG. 14g (G) Teaching Actions 11 - 14
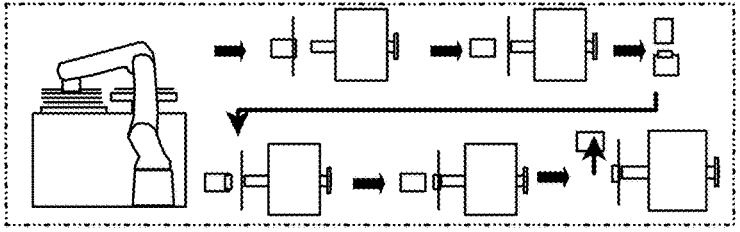
FIG. 14h (H) Measure Wobble
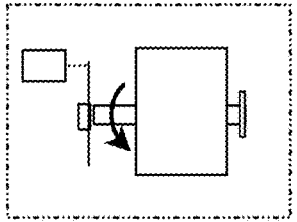

FIG. 15a
(A) Teaching Actions 16 (Measuring Position → Main Spindle 21)
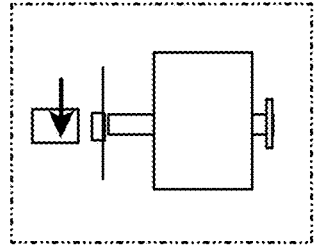
FIG. 15b
(B) Teaching Actions 03 – 04
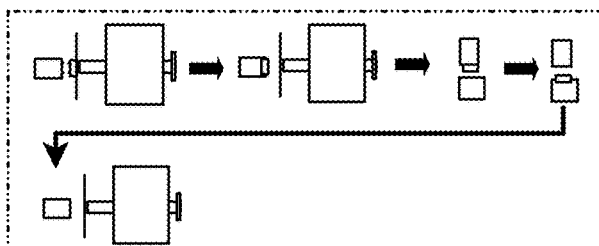
FIG. 15c
(C) Teaching Actions 07 – 10
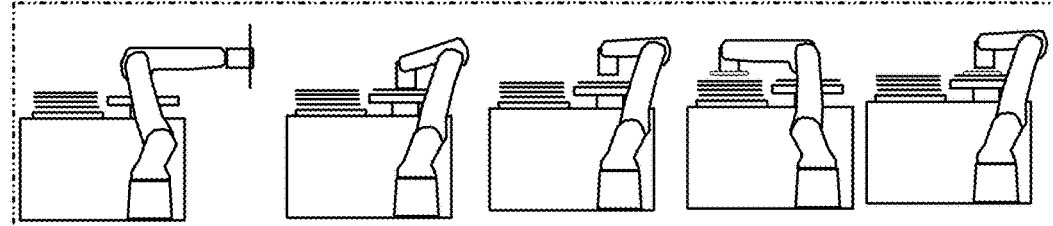
(D) Teaching Actions 21 (Mount 72 → Main Spindle 21)
FIG. 15d
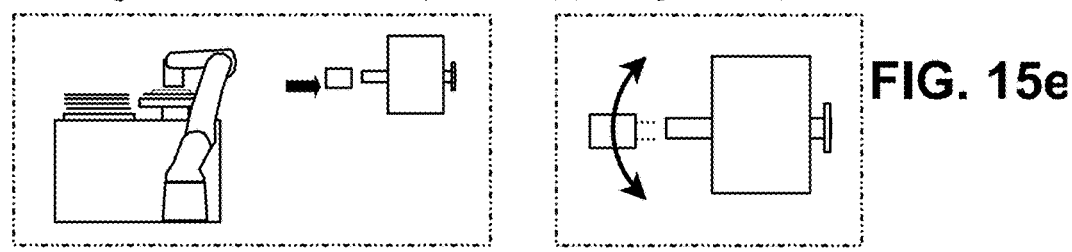
(E) Teaching Actions 19 (Blow Air)
FIG. 15e
(F) Teaching Actions 20 (Main Spindle 21 → Mount 71)
FIG. 15f
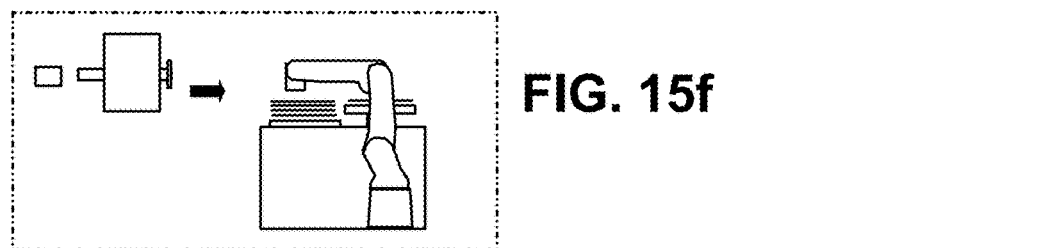
(G) Teaching Actions 11 – 14
FIG. 15g
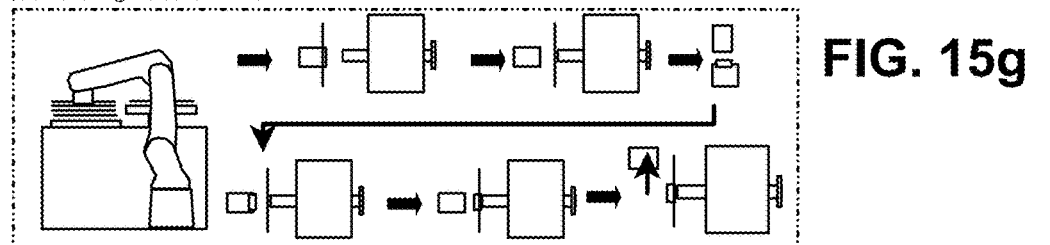
(H) Measure Wobble
FIG. 15h
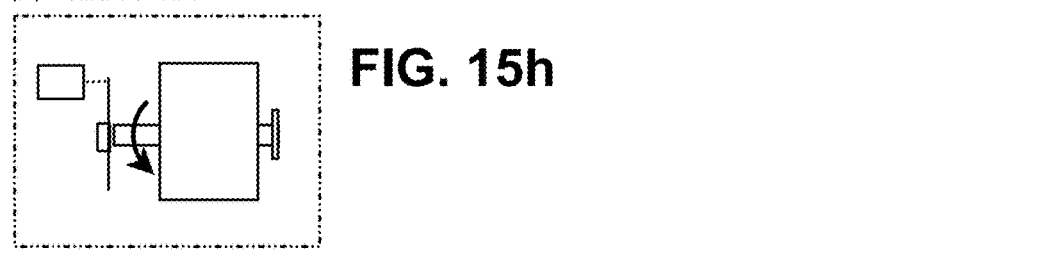

CIRCULAR SAW CUTTING MACHINE

BACKGROUND OF THE INVENTION

The present invention relates to a circular saw cutting machine and particularly to the technology to automatically change saws.

Generally, in a circular saw cutting machine, the central mounting hole of a circular saw is fitted on the mounting portion provided at the top end of the spindle whereupon a nut is threadedly fitted on a screw portion and tightened and fixed.

Therefore, to change the saw, the nut must be removed and attached, and it is troublesome to do this while manually holding the spindle from dragging, which requires a long time and thus reduces the workability. To solve this problem, a cutting machine is proposed that includes a cutter stocker that separately stores new cutters and used cutters, a nut runner that removes and attaches the spindle nut, and an arm that grips a cutter and swings between the spindle and the cutter stocker (for example, in Japanese Published Unexamined Patent Application No. 2013-248672).

SUMMARY OF THE INVENTION

As the conventional automatic saw change machine requires a nut runner, a swing arm, a cutter stocker, etc., to be integrally provided with a circular saw cutting machine, for example, the freedom of machine design and the freedom of plant layout are inadvertently limited. As a result, it is difficult to completely automate the change of cutters in the circular saw cutting machine, making nighttime operation difficult without deploying workers.

The present invention was made to enable automatic changing of saws without adversely affecting the freedom of machine design and the freedom of plant layout.

A circular saw cutting machine according to the present invention made to achieve the above-described object comprises: a main spindle, a main spindle motor, and a power transmission mechanism, a frame movably guided on a guide rail between a cutting position and a withdrawal position under the transfer control of a transfer motor, and a cutter mount mechanism for mounting a circular saw on a mounting shaft provided at a top end of the main spindle in a rotation preventive manner.

(1A) The circular saw includes a mounting hole into which the mounting shaft can be inserted and a plurality of pin insertion holes equidistantly arranged in concentric positions around the center of the mounting hole.

(1B) The cutter mount mechanism comprises: a pull-in fixing mechanism including a cutter presser piece mounted to interpose the circular saw between the cutter presser piece and a front end face of the main spindle, a plurality of pins capable of being inserted through the pin insertion holes of the circular saw in concentric positions around a center of the mounting shaft of the main spindle, a plurality of pin holes into which the plurality of pins can be inserted, wherein the pins are provided on one of a rear face of the cutter presser piece and the front end face of the main spindle while the pin holes are provided on the other of the rear face and the front end face to make pairs with the pins, and wherein the cutter presser piece is pulled in toward the front end face of the main spindle to be fixed while the plurality of pins are inserted in the paired pin holes with the plurality of pins inserted through the plurality of pin insertion holes of the circular saw; and a pull-in release mechanism for releasing the fixing of the cutter presser piece by the pull-in fixing mechanism so that the cutter presser piece can be removed from the main spindle, and further wherein at least one of the plurality of pins is provided on the front end face of the main spindle.

According to the circular saw cutting machine of the present invention, the circular saw is fixed and interposed by the pull-in fixing mechanism between the front end face of the main spindle and the cutter presser piece with the pins inserted in the pin insertion holes. This makes it possible to fix or secure the circular saw in a manner that prevents its rotation with respect to the main spindle without a nut tightened thereon. When removing the circular saw, the pull-in release mechanism can be operated to makes the cutter presser piece removable from the main spindle. This allows the circular saw to be detached without providing a nut runner. Furthermore, as at least one of the plurality of pins is provided on the front end face of the main spindle, when the cutter presser piece is removed, the circular saw is penetrated by the mounting shaft of the main spindle and the at least one pin. This can prevent the circular saw from rotation with respect to the main spindle. As a result, this provides for smooth cutter changing operation using an articulated robot as described below.

The circular saw cutting machine of the present invention may further comprise:

(2) a spindle home position stopping mechanism that includes a brake for stopping the rotation of the main spindle and a sensor for detecting a rotational angle of the main spindle, the spindle home position stopping mechanism stopping the main spindle in a predetermined home angle condition by controlling the main spindle motor and the brake based on the rotational angle detected by the sensor.

Due to the feature (2) described above, the circular saw can be attached and removed with the main spindle in a predetermined home angle condition. This allows for accurate positioning in the attachment and removal of the circular saw and the cutter presser piece when changing the cutter using the articulated robot as described below.

The circular saw cutting machine of the present invention may further comprise:

(3A) a cutter stocker including a new cutter mount on which new cutters are disposed and a used cutter mount on which used cutters are disposed, each of the new cutter mount and the used cutter mount having erected thereon a plurality of pillars that correspond to the plurality of pin insertion holes provided in the circular saw, and an articulated robot for passing cutters between the cutter stocker and the circular saw cutting machine;

(3B) a cutter presser piece mount provided with pin holes or pins that are paired with the pins or the pin holes provided in the cutter presser piece, the cutter presser piece mount being installed within a working range of the articulated robot;

(3C) a cutter change preparation mechanism for controlling the transfer motor to transfer the frame to a cutter change position, operating the spindle home position stopping mechanism to stop the main spindle in the predetermined home angle condition, and operating the pull-in release mechanism to place the cutter presser piece in a removable condition;

(3D) a cutter change command unit for causing the articulated robot to: remove the cutter presser piece, which is placed in a removable condition by the cutter change preparation mechanism, from the main spindle and transfer the cutter presser piece to the cutter presser piece mount; remove the circular saw from the main spindle after the cutter presser piece is removed from the main spindle and transfer the circular saw to the used cutter mount; remove a circular saw from the new cutter mount and mount the circular saw to the main spindle; and pick up the cutter presser piece transferred to the cutter presser piece mount and mount the cutter presser piece to the main spindle; and (3E) a cutter fixing unit for operating the pull-in fixing mechanism to fix the cutter while the circular saw removed from the new cutter mount and the cutter presser piece picked up the cutter presser piece mount are mounted to the main spindle by the cutter change command unit.

To change the circular saw, the cutter change preparation mechanism in (3C) controls the transfer motor to transfer the frame to a cutter change position, operating the spindle home position stopping mechanism to stop the main spindle in the predetermined home angle condition, and operating the pull-in release mechanism to place the cutter presser piece in a removable condition. By stopping the main spindle in the predetermined home angle condition, the pins, the pin holes, and the pillars of the main spindle, the cutter presser piece mount, the used cutter mount, and the new cutter mount can be placed in a predetermined physical relationship. As a result, the pins and the pillars can be accurately inserted through the plurality of pin insertion holes of the circular saw when the cutter change command unit in (3D) causes the articulated robot to: remove the circular saw from the main spindle after the cutter presser piece is removed from the main spindle and transfer the circular saw to the used cutter mount; and remove a circular saw from the new cutter mount and mount the circular saw to the main spindle. This is because, as described in (3A), each of the new cutter mount and the used cutter mount provided in the cutter stocker has erected thereon a plurality of pillars that correspond to the plurality of pin insertion holes provided in the circular saw. Moreover, when the cutter change command unit in (3D) causes the articulated robot to: remove the cutter presser piece from the main spindle and transfer the cutter presser piece to the cutter presser piece mount; and pick up the cutter presser piece transferred to the cutter presser piece mount and mount the cutter presser piece to the main spindle, the cutter presser piece can be mounted to the front end face of the main spindle with the pins accurately inserted through the plurality of pin insertion holes of the circular saw. This is because, as described in (3B), the cutter presser piece mount, which is provided with pin holes or pins that are paired with the pins or the pin holes provided in the cutter presser piece, is installed within a working range of the articulated robot. In this way, according to the circular saw cutting machine described in (1A), (1B), (2), and (3A)-(3E), the articulated robot is used to change circular saws in a reliable and smooth manner, so as not to inadvertently limit the design of the circular saw cutting machine itself or the freedom of plant layout.

In another preferred aspect of the circular saw cutting machine of the present invention, (4) the articulated robot includes an air blow unit for blowing air and the cutter change command unit is configured to operate the air blow unit to remove cuttings before removing the cutter presser piece from the main spindle.

Due to the feature described in (4), the articulated robot can remove cuttings while the circular saw is removed, which eliminate the need for a worker to remove cuttings and enables accurate change of the circular saw.

In still another preferred aspect of the circular saw cutting machine of the present invention, (5A) the articulated robot includes a distance measurement unit for measuring a distance; and (5B) the circular saw cutting machine further includes a wobble determination unit (i.e., a machine controller) for determining whether or not a wobble greater than or equal to a predetermined level occurs in a newly mounted circular saw by operating the distance measurement unit of the articulated robot, the determination being made while the main spindle motor is driven to rotate the newly mounted circular saw after the circular saw is fixed by the cutter fixing unit.

Due to the features described in (5A) and (5B), it is possible to determine whether or not the new circular saw is accurately mounted through the control operation of the articulated robot.

In one aspect, the circular saw cutting machine of the present invention may further comprise:

(6A) a cutter re-change preparation mechanism for operating the spindle home position stopping mechanism to stop the main spindle in the predetermined home angle condition if the wobble determination unit determines that a wobble greater than or equal to the predetermined level occurs in the newly mounted circular saw;

(6B) a cutter re-change command unit for causing the articulated robot to: remove the cutter presser piece, which is placed in a removable condition by the cutter re-change preparation mechanism, from the main spindle and transfer the cutter presser piece to the cutter presser piece mount;

remove the newly mounted circular saw from the main spindle after the cutter presser piece is removed from the main spindle and return the newly mounted circular saw to the new cutter mount of the cutter stocker; remove the circular saw from the new cutter mount and mount the circular saw to the main spindle after operating the air blow unit to remove cuttings from the main spindle with the circular saw removed therefrom; pick up the cutter presser piece transferred to the cutter presser piece mount and mount the cutter presser piece to the main spindle; and (6C) a cutter re-fixing unit for operating the pull-in fixing mechanism to fix the circular saw with the circular saw and the cutter presser piece mounted to the main spindle by the cutter re-change command unit.

If the result of the wobble determination described in (5A) and (5B) is unsatisfactory, it is possible to perform cutter change again. The cutter re-change command unit described in (6B) can perform a cutter mounting or attachment operation identical to the initial cutter change operation by returning the cutter removed from the main spindle to the new cutter mount rather than the used cutter mount. Additionally, the air blow unit may be operated to remove cuttings before the new cutter is remounted. In this way, the cause of the wobble, for example, the cuttings that were left on the rear face of the circular saw before the new circular saw was initially mounted, can be eliminated. It should be noted that this does not preclude blowing air to remove any cuttings that may be on the rear face of the circular saw before the new circular saw is initially mounted.

Also, to remount the circular saw, the cutter re-change preparation mechanism in (6A) stops the main spindle in the predetermined home angle condition. Therefore, the series of steps from the removal of the cutter presser piece by the cutter re-change command unit described in (6B) to the fixing of the cutter presser piece by the cutter re-fixing unit described in (6C) can be performed in an accurate manner.

Now, if a wobble greater than or equal to the predetermined level persists even after performing cutter change operation again, the circular saw picked up from the new cutter mount may be defective.

The circular saw cutting machine of the present invention may further comprise:

(7A) a wobble re-determination unit (i.e., a machine controller) for determining whether or not a wobble greater than or equal to the predetermined level occurs in the newly mounted circular saw by operating the distance measurement unit of the articulated robot, the determination being made while the main spindle motor is driven to rotate the newly mounted circular saw after the circular saw is fixed by the cutter re-fixing unit; and (7B) a newer cutter change unit for, if the wobble re-determination unit determines that a wobble greater than or equal to the predetermined level occurs, causing the cutter change preparation mechanism, the cutter change command unit, and the cutter fixing unit to perform cutter change operation to replace the circular saw, determined to have a wobble greater than or equal to a predetermined level, with a newer circular saw as a used circular saw.

In yet another preferred aspect, the circular saw cutting machine of the present invention may further comprise:

(8) a warning device for stopping the cutter change operation and performing warning operation if it is determined that a wobble greater than or equal to the predetermined level occurs even after the newer cutter change unit performs cutter change operation predetermined times.

Due to the features described in (7A) and (7B), if the circular saw itself is defective, the articulated robot may be operated to perform cutter change operation again. Moreover, due to the feature described in (8), if the cause of the problem is not the cutter itself, for example, if cuttings are lodged in the cutter presser piece or the front end face of the main spindle, an alarm may be issued to prompt a worker to take an appropriate action rather than continuing futile cutter change operation.

In another aspect, the circular saw cutting machine provided with the cutter stocker and the articulated robot to automatically change circular saws may further comprise:

(9A) a determination unit (e.g., machine controller) for determining when to change a circular saw and a main controller (e.g., machine controller) for controlling the transfer motor, the main spindle motor, the brake, the pull-in fixing mechanism, the pull-in release mechanism, the air blow unit, and the distance measurement unit; and (9B) a robot controller for controlling the articulated robot, the robot controller being distinct from the main controller; and (9C) wherein the robot controller and the main controller are configured to perform cutter change by exchanging signals therebetween. Due to these features, it is possible to change circular saws without limiting the freedom of design of the circular saw cutting machine. At the same time, it is possible to determine the arrangement or positioning of the articulated robot and the cutter stocker without limiting the plant layout.

The present invention provides for automatic changing of circular saws without adversely affecting the freedom of machine design and the freedom of plant layout.

BRIEF DESCRIPTION OF THE DRAWINGS

FIG. 3c-2 shows a cross section taken on lines a-a of FIG. 3c-1.

FIG. 3c-3 shows a cross section taken on lines b-b of FIG. 3c-1.

FIGS. 11a-11f is a schematic diagram showing the progress of the control operation according to Embodiment 1.

FIGS. 12a-12i are schematic diagrams showing the progress of the control operation according to Embodiment 1.

FIGS. 13a-13g are schematic diagrams showing the progress of the control operation according to Embodiment 1.

FIGS. 14a-14h are schematic diagrams showing the progress of the control operation according to Embodiment 1.

FIGS. 15a-15h are schematic diagrams showing the progress of the control operation according to Embodiment 1.

DETAILED DESCRIPTION OF THE PREFERRED EMBODIMENTS

The present invention will be described hereinafter with reference to several preferred embodiments.

Embodiment 1

Figure 1A:
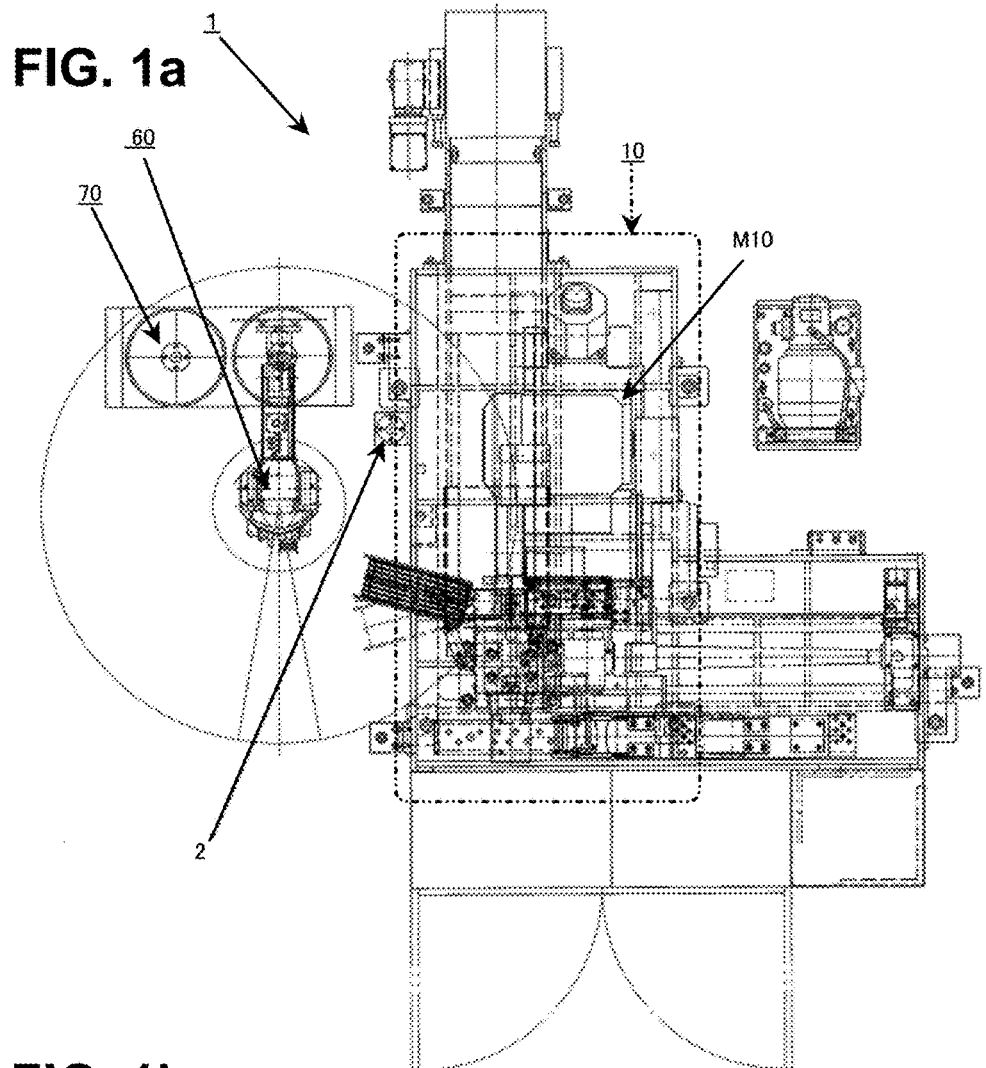
FIG. 1a shows a plan view of a circular saw cutting machine according to Embodiment 1 of the present invention.
Figure 1B:
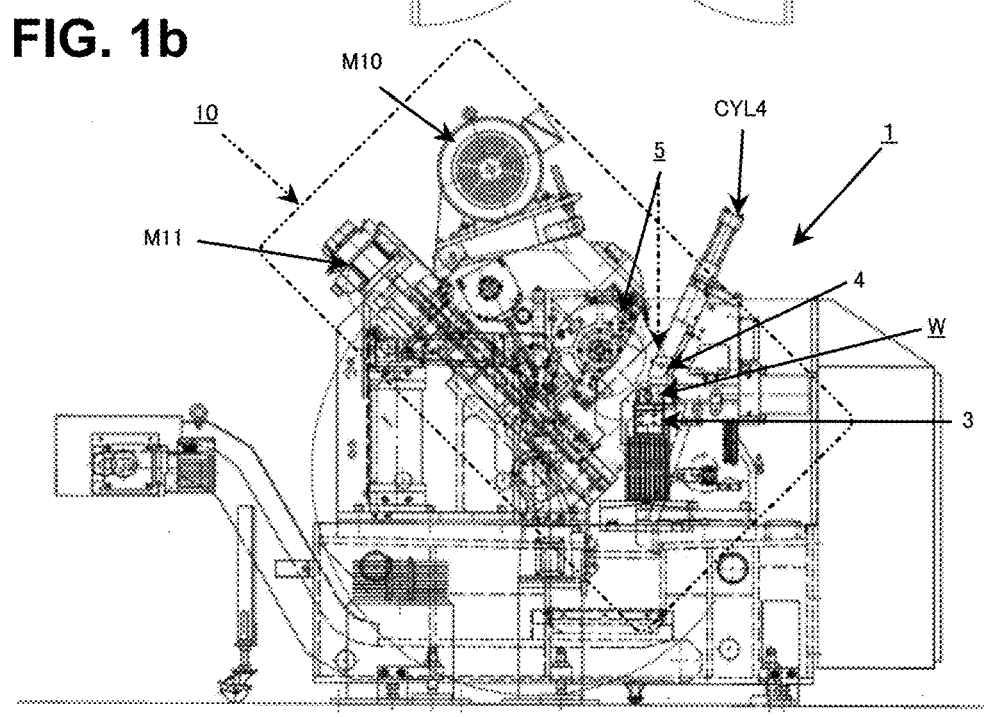
FIG. 1b shows a left side view of the circular saw cutting machine.

As shown in FIGS. 1a and 1b, the circular saw cutting machine 1 of Embodiment 1 includes a machine main body 10, an articulated robot 60, and a cutter stocker 70.

Installed to one side of the circular saw cutting machine 1 is a cutter presser piece mount 2 on which a cutter presser piece is mounted while the circular saw is changed. Furthermore, the circular saw cutting machine 1 is provided with a feed mechanism that feeds a predetermined length of work W made of a steel round bar at a time in the longitudinal direction thereof and a worktable 3 and work clamp claws 4 for clamping the work W at a cutting position.

The circular saw cutting machine 1 includes a control unit (which will be described below) for: causing a work feed mechanism to intermittently feed the work W; driving a work clamp cylinder CYL4 to protrude the work clamp claws 4 toward the worktable 3 so that the work W is clamped with the predetermined length thereof protruding from the cutting line; causing a transfer motor M11 to transfer a circular saw 5 driven by a main spindle motor M10 to the cutting position (indicated by alternate long and short dashed lines in the figure) to cut the work W; then, reversing the transfer motor M11 to return the circular saw 5 to the return position (indicated by solid lines in the figure); operating the work clamp cylinder CYL4 in an unclamping direction; causing the work feed mechanism to perform intermittent feeding for the next cutting; and then successively repeating the series of actions of clamping the work, cutting with the circular saw, returning of the circular saw, unclamping of the work, and intermittent feeding of the work, thereby automatically performing production of forging blanks of the predetermined length from the steel round bar.

Figure 3A:
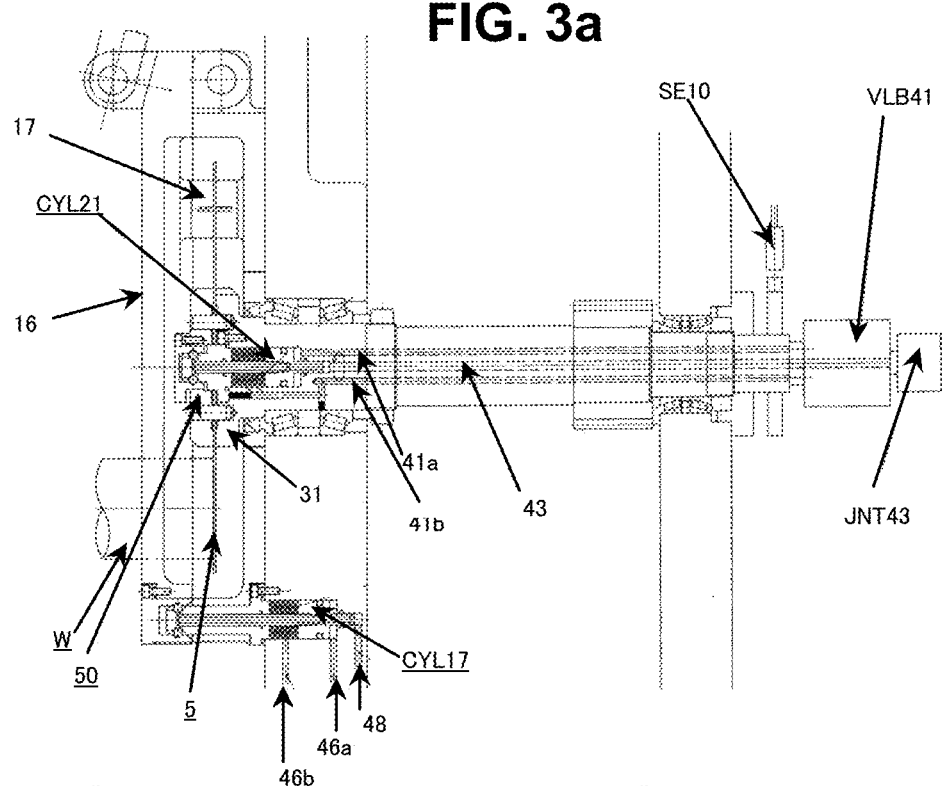
FIG. 3a shows a cross section of a cutter attachment and removal mechanism of the circular saw cutting machine according to Embodiment 1.
Figure 3B:
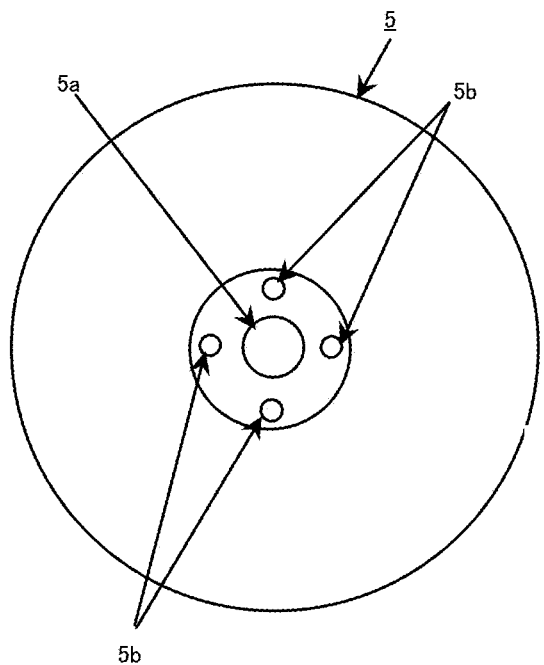
FIG. 3b shows a front view of a circular saw.
Figures 1, 3C:
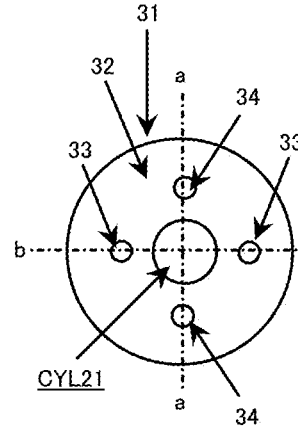
FIG. 3c-1 shows a front view of a cutter mounting member of the circular saw cutting machine according to Embodiment 1.
Figures 2, 3C:
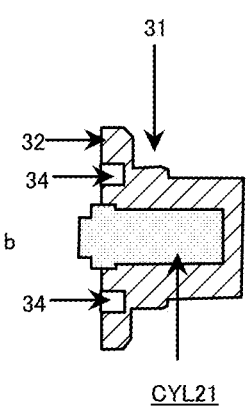
Figures 3, 3C:
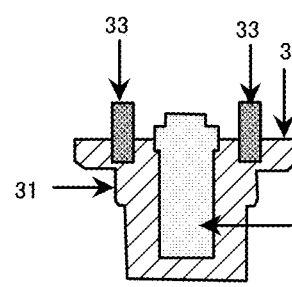

As shown in FIGS. 2-4, in the machine main body 10, a frame 11 to which the circular saw 5 is attached is slidably disposed on a guide rail 13 that is tiltedly disposed with respect to a base 12. This frame 11 is caused to reciprocate along the guide rail 13 under position control by the transfer motor M11, which comprises a servomotor, thereby driving a shaft feed mechanism in a normal rotational direction or in a reverse rotational direction.

Figure 2A:
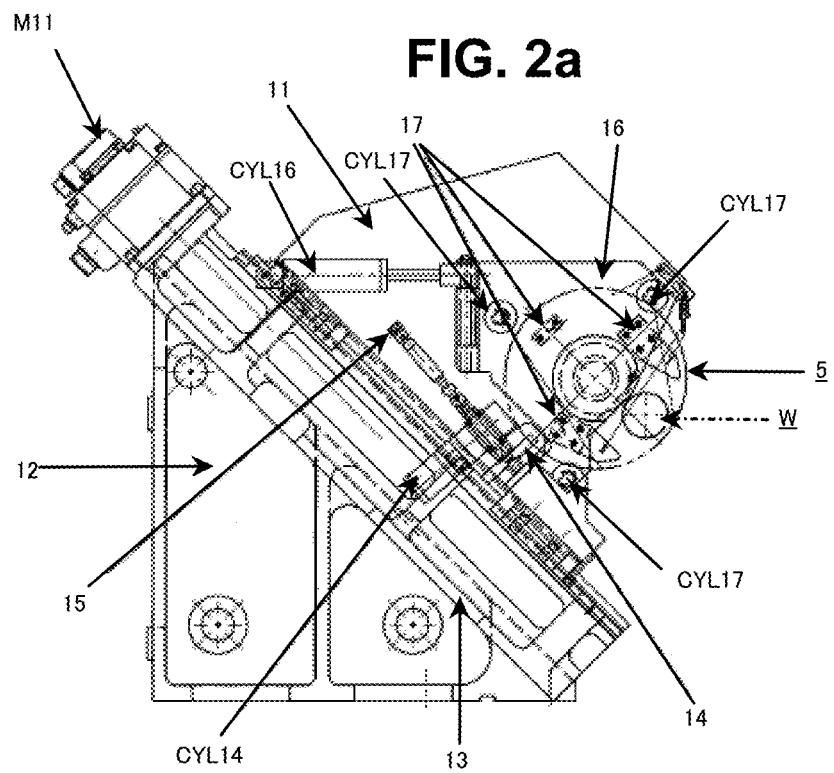
FIG. 2a shows a left side view of a machine main body of the circular saw cutting machine according to Embodiment 1.

As shown in FIG. 2*a*, the frame 11 is also provided with a brush 14 that comes into contact with the lower portion of the circular saw 5 to remove the cuttings adhering to the saw during the operation of the circular saw 5. The brush 14 is mounted on a brush rotational shaft 15 rotatably disposed with respect to the frame 11 so as to cause a brush retraction cylinder CYL14 to retract the brush in a downward direction away from the circular saw 5 while removing the circular saw 5.

Figure 2B:
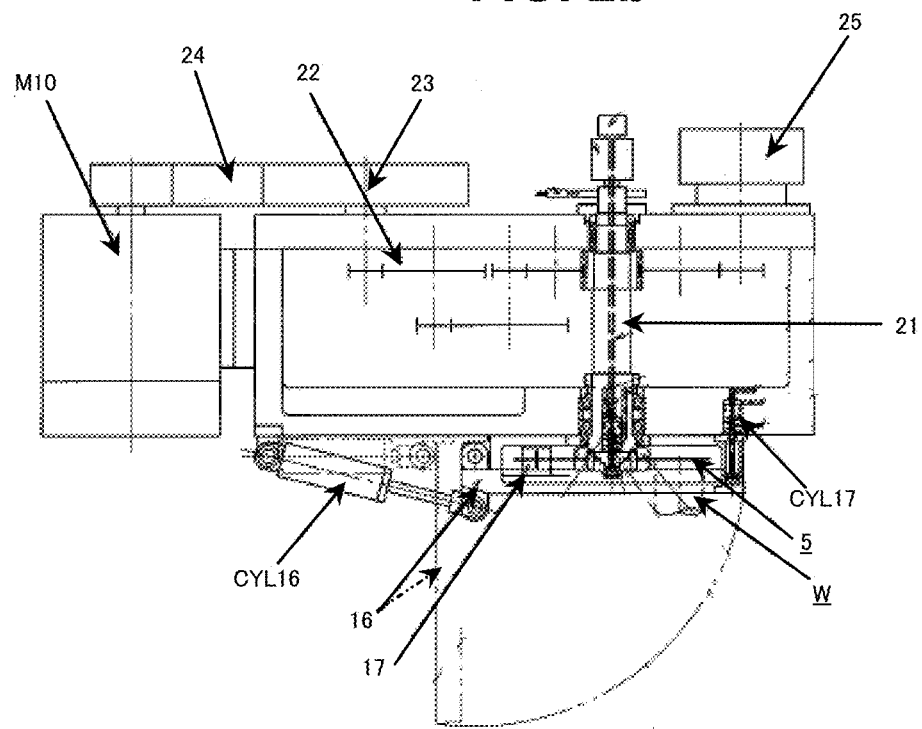
FIG. 2b shows a plan view of the machine main body.

As shown in FIGS. 2*a* and 2*b*, mounted on the frame 11 is a presser lid 16 that covers a disc face of the circular saw 5 in a manner that can be opened and closed by an open-and-close cylinder CYL16. Attached to the rear face of the presser lid 16 are three pads 17 that come into abutment with the disc face of the circular saw 5 when the presser lid 16 is closed. Additionally provided are three pad presser cylinders CYL17 to maintain the three pads 17 in abutment with the disc face of the circular saw 5 when the presser lid 16 is closed.

The frame 11 has mounted thereon a gear box 22 for transmitting the power of the main spindle motor M10 to the main spindle 21 on which the circular saw 5 is mounted. The power of the main spindle motor M10 is transmitted to an input shaft 23 of the gear box 22 via a timing belt 24. The power transmitted to the input shaft 23 is in turn transmitted to the main spindle 21 via a group of gears contained in the gearbox 22. It should be noted that a brake 25 is also attached to the gearbox 22.

As shown in FIG. 3*a*, provided on the top of the main spindle 21 is a cutter mounting member 31 that contains a cutter clamp cylinder CYL21. The cutter clamp cylinder CYL21 is mounted so as to be aligned with the central axis of the main spindle 21 and has a front end portion thereof protruding from the front end face 32 of the cutter mounting member 31 to form a cutter mounting shaft. The outer diameter of the front end of the cutter clamp cylinder CYL21 is made slightly smaller than the mounting hole 5*a* of the circular saw 5 shown in FIG. 3*b*. In addition, the circular saw 5 has formed therein four pin insertion holes 5*b* which are circumferentially shifted 90 degrees from each other so as to be located concentrically with respect to the mounting hole 5*a*.

Furthermore, as shown in FIGS. 3*c*-1 to 3*c*-3, two pins 33 and two pin holes 34 are provided in the front end face 32 of the cutter mounting member 31 of the main spindle 21 so as to be located concentrically around the axial center of the main spindle 21. The two pins 33 are disposed in locations 180 degrees shifted around the axial center from each other with the two pin holes 34 formed also 180 degrees shifted around the axial center from each other.

Additionally, the pins 33 and the pin holes 34 are shifted 90 degrees from each other around the axial center of the main spindle 21. The pins 33 and the pin holes 34 can be brought into alignment with the pin insertion holes 5*b* passing through the circular saw 5.

A position sensor disk 35 is attached to the rear end portion of the main spindle 21. A spindle stop position sensor SE10 mounted on the outer circumference of the disk 35 generates a signal identifying the rotation angle of the main spindle. In this embodiment, the brake 25 is controlled based on the detection signal of this spindle stop position sensor SE10 so that the main spindle 21 can be stopped at the home angle.

Figure 4A:
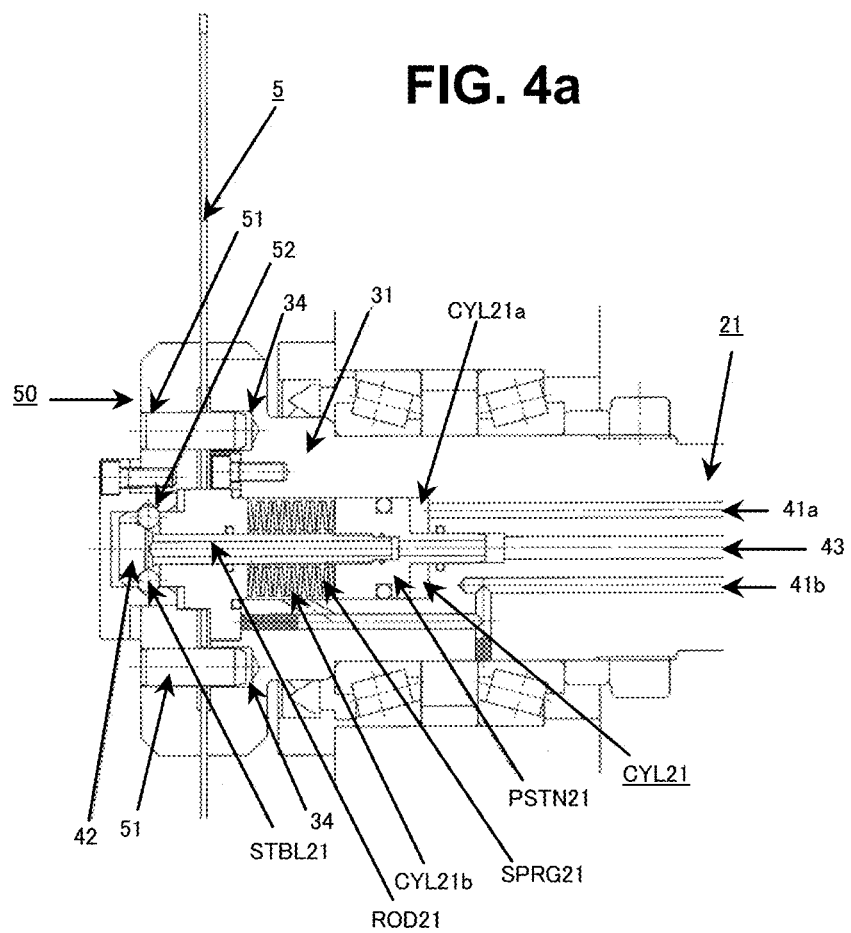
FIG. 4a shows a cross section of an essential portion of the cutter attachment and removal mechanism of the circular saw cutting machine according to Embodiment 1.

As shown in FIG. 4*a*, the circular saw 5 is first mounted on the cutter mounting member 31 so as to align the four pin insertion holes 5*b* with respect to the pins 33 and the pin holes 34 and then attached thereto with the cutter presser piece 50 pressing the circular saw 5 against the front end face 32 of the cutter mounting member 31. The cutter presser piece 50 has provided thereon two pins 51 corresponding to the two pin holes 34 of the cutter mounting member 31 and two pin holes (not shown) corresponding to the two pins 33. The cutter presser piece 50 and the cutter mounting member 31 are assembled together so as to insert the pins of each to the counterpart pinholes of the other. In this way, the circular saw 5 is mounted by being interposed between the front end face 32 of the cutter mounting member 31 and the cutter presser piece 50 with the total of four pins of the cutter mounting member 31 and the cutter presser piece 50 inserted through the four pin insertion holes 5*b*. With these four pins 33 and 51 inserted through the pin insertion holes 5*b*, the circular saw 5 is caused to integrally rotate with the main spindle 21 without rotational sift.

At this moment, the cutter clamp cylinder CYL21 causes the cutter presser piece 50 to press the circular saw 5 against the front end face of the cutter mounting member 31 in a clamping condition.

As shown in FIG. 4*a*, in the cutter clamp cylinder CYL21, separate hydraulic flow paths 41*a* and 41*b* are provided in communication with an unclamping-side hydraulic chamber CYL21*a* and a clamping-side hydraulic chamber CYL21*b*, respectively. These hydraulic flow paths 41*a* and 41*b* are adapted to switch by a hydraulic rotary valve VLB41 (see FIG. 3*a*) provided at the rear end of the main spindle 21.

When hydraulic pressure is introduced into the clamping-side hydraulic chamber CYL21*b*, a piston PSTN21 is moved rearward. This moves rearward a tapered piece 42 at the top of a rod ROD21 attached to the piston PSTN21. Then, a plurality of steel balls STBL21 accommodated on the rear side of the tapered piece 42 are pushed outward. As a result, the steel balls STBL21 fit in the tapered portion 52 formed in the cutter presser piece 50, pulling the cutter presser piece 50 in the direction to press against the disk surface of the circular saw 5.

In addition, contained in the clamping-side hydraulic chamber CYL21b is a spring SPRG21 for biasing the rod ROD21 in the pull-in direction to prevent the steel balls from dropping out. This spring SPRG21 applies a biasing force to the rod ROD21 in the pull-in direction even when the hydraulic fluid is drained from the clamping-side hydraulic chamber CYL21b. As a result, the steel balls STBL21 are retained in a ring-shaped retainer groove (not shown) formed around the base portion of the tapered piece 42 to prevent them from dropping.

When hydraulic pressure is introduced into the unclamping-side hydraulic chamber CYL21a, the piston PSTN21 is moved forward. This causes the tapered piece 42 of the top of the rod ROD21 attached to the piston PSTN21 to release the steel balls STBL21. As a result, when the cutter presser piece 50 is pulled out forward, the steel balls STBL21 are moved inward by the tapered portion 52 so as to enable the removal of the cutter presser piece 50.

As shown in FIG. 4a, the main spindle 21 has formed therein an air blow passage 43 that passes through the center of the piston PSTN21 and the rod ROD21. Blow air is supplied to the air blow passage 43 via an air rotary joint JNT43 (see FIG. 3a) provided at the rear end portion of the main spindle 21. This blow air blows out of blowout holes formed radially at the base portion of the tapered piece 42 to blow the cuttings from the vicinity of the steel balls STB21.

The vibration of the circular saw 5 during cutting is damped by a mechanism in which the circular saw 5 is first held against the main shaft 21 by the cutter presser piece 50 and, additionally, the three pads attached on the rear surface of the presser lid 16 pressures a disk surface.

Figure 4B:
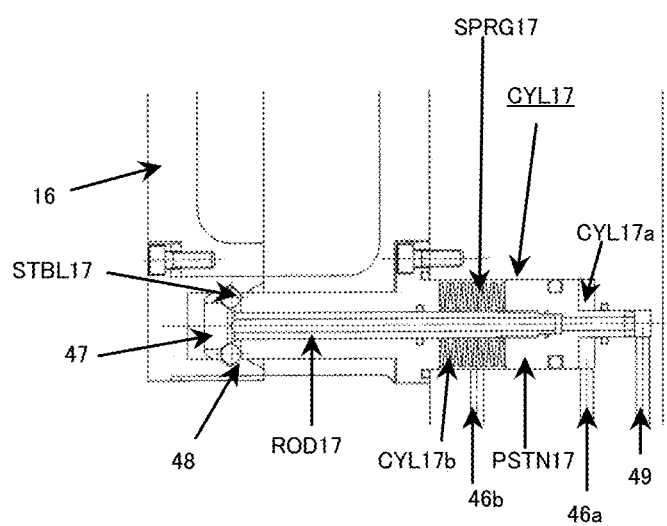
FIG. 4b shows a cross section of an essential portion of a cutter presser of the circular saw cutting machine according to Embodiment 1.

FIG. 4b shows an essential portion of the circular saw cutting machine in which the presser lid 16 is closed by the open-and-close cylinder CYL16. By driving the pad presser cylinders CYL17 with the presser lid 16 closed in this manner, the pads 17 are brought into abutment with the disk surface of the circular saw 5. Three mechanisms identical to that shown in FIG. 4b are disposed in as many locations to correspond to the three pats 17.

In the pad presser cylinders CYL17, separate hydraulic flow paths 46a and 46b are provided in communication with an unclamping-side hydraulic chamber CYL17a and a clamping-side hydraulic chamber CYL17b, respectively. When hydraulic pressure is introduced into the clamping-side hydraulic chamber CYL17b, a piston PSTN17 is moved rearward. This moves rearward the tapered piece 47 of the top of the rod ROD21 attached to the piston PSTN17. Then, a plurality of steel balls STBL17 accommodated on the rear side of the tapered piece 47 are pushed outward. As a result, the steel balls STBL17 fit in the tapered portion 48 formed in the presser lid 16, pulling the presser lid 16 in the direction to cause the pads 17 to press against the disk surface of the circular saw 5.

A spring SPRG17 for preventing the steel balls from dropping out is contained also in the pad presser cylinders CYL17, and this applies a biasing force to the rod ROD17 in the pull-in direction even when the hydraulic fluid is drained from the clamping-side hydraulic chamber CYL17b. As a result, the steel balls STBL17 are retained in a ring-shaped retainer groove (not shown) formed around the base portion of the tapered piece 47 to prevent them from dropping.

When hydraulic pressure is introduced into the unclamping-side hydraulic chamber CYL17a, the piston PSTN17 is moved forward. This causes the tapered piece 47 of the top of the rod ROD17 attached to the piston PSTN21 to release the steel balls STBL17. As a result, when an open-and-close cylinder CYL16 is driven to rotate the presser lid 16 to open, the steel balls STBL17 are moved inward by the tapered portion 48 so as to be able to open the presser lid 16.

Also provided in each of the pad presser cylinders CYL17 is an air blow passage 49 that passes through the center of the piston PSTN17 and the rod ROD17. The blow air is adapted to blow out of blowout holes formed radially at the base portion of the tapered piece 47 to blow the cuttings from the vicinity of the steel balls STB21.

Figure 5A:
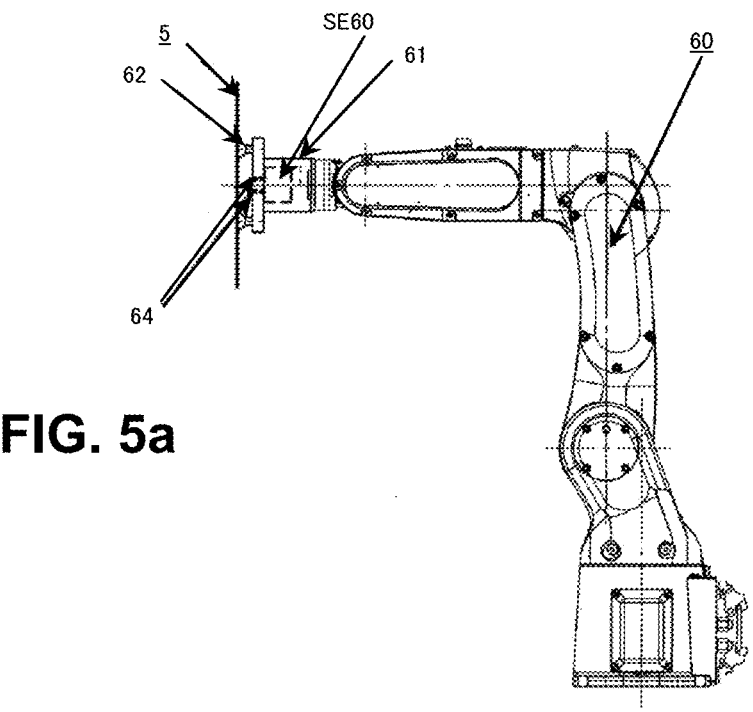
FIG. 5a shows an overall side view of an articulated robot of Embodiment 1.
Figure 5B:
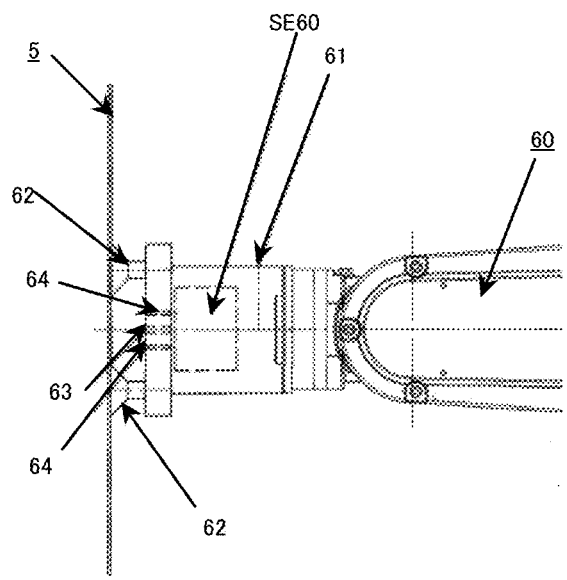
FIG. 5b shows an enlarged cross section of an essential portion of the articulated robot to which the circular saw adheres.
Figure 5C:
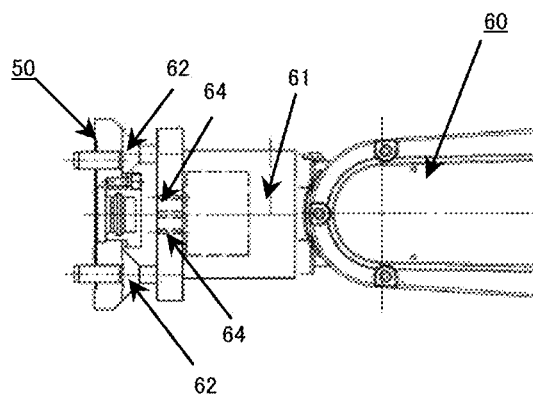
FIG. 5c shows an enlarged cross section of the essential portion of the articulated robot to which a cutter presser piece adheres.

The articulated robot 60 performs the attachment and removal of the circular saw 5, As shown in FIGS. 5a-c, the articulated robot 60 has, at the front end face of the top arm 61, suction members 62 to which the circular saw 5 and the cutter presser piece 50 adhere. In this embodiment, four suction members 62 are provided in concentric positions around the center of the top arm 61 at 90-degree intervals. Additionally, the top arm 61 is also provided with a photo sensor SE60. The photo sensor SE60 is configured to measure a distance by emitting light via a detection hole 63 made along the central line of the top arm 61 and receiving a reflected light. A plurality of air blow holes 64 are provided concentrically around the detection hole 63. Air blow holes 64 are provided to remove the cuttings during the attachment and removal of the circular saw 5 and the cutter presser piece 50 by blowing air with the front end face of the top arm 61 opposing them.

Figure 6A:
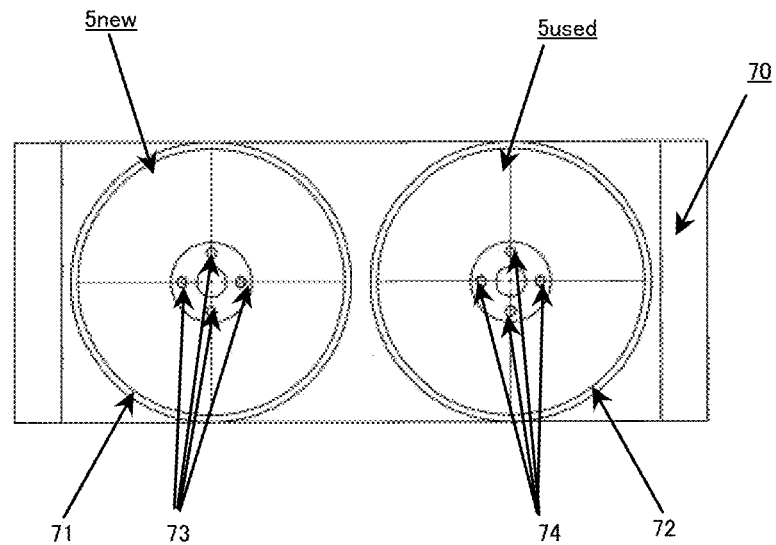
FIG. 6a shows a plan view of a cutter stocker according to Embodiment 1.
Figure 6B:
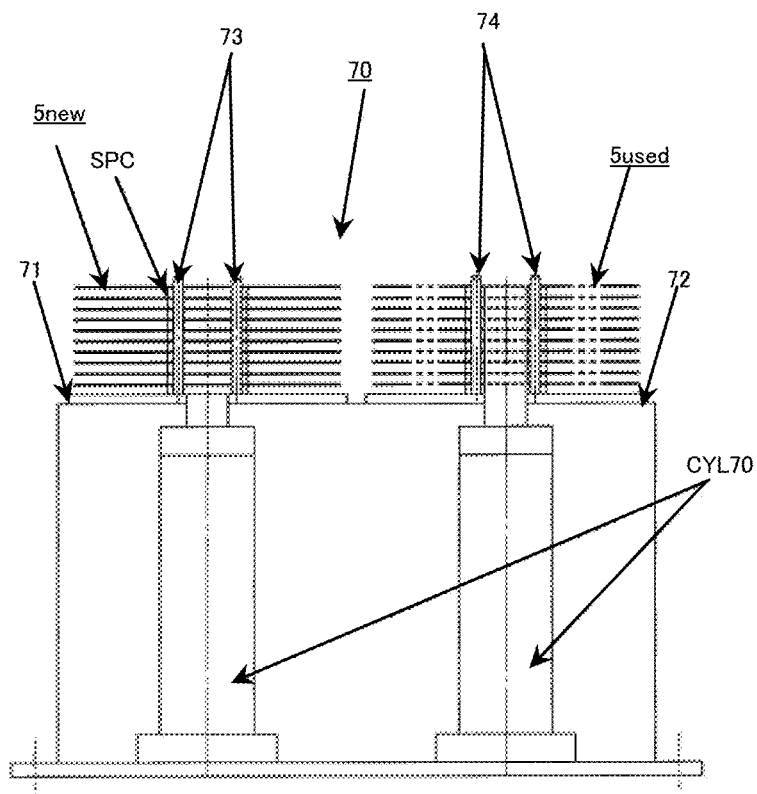
FIG. 6b shows a front view of the cutter stocker.

As shown in FIGS. 6a-b, the cutter stocker 70 has a new cutter mount 71 that holds new circular saws 5*new* and a used cutter mount 72 that holds used circular saws 5*used*. The new cutter mount 71 and the used cutter mount 72 each have four pillars 73, 74 erected thereon for being inserted in the pin insertion holes 5b of the circular saws 5. Moreover, the new cutter mount 71 and the used cutter mount 72 are controlled by the robot cylinders CYL70 so that the topmost circular saws on both mounts are automatically located at the same height.

Furthermore, the cutter presser piece mount 2 has pin holes and pins that correspond to the pins 51 and the pin holes, respectively, of the cutter presser piece 50.

Figure 7:
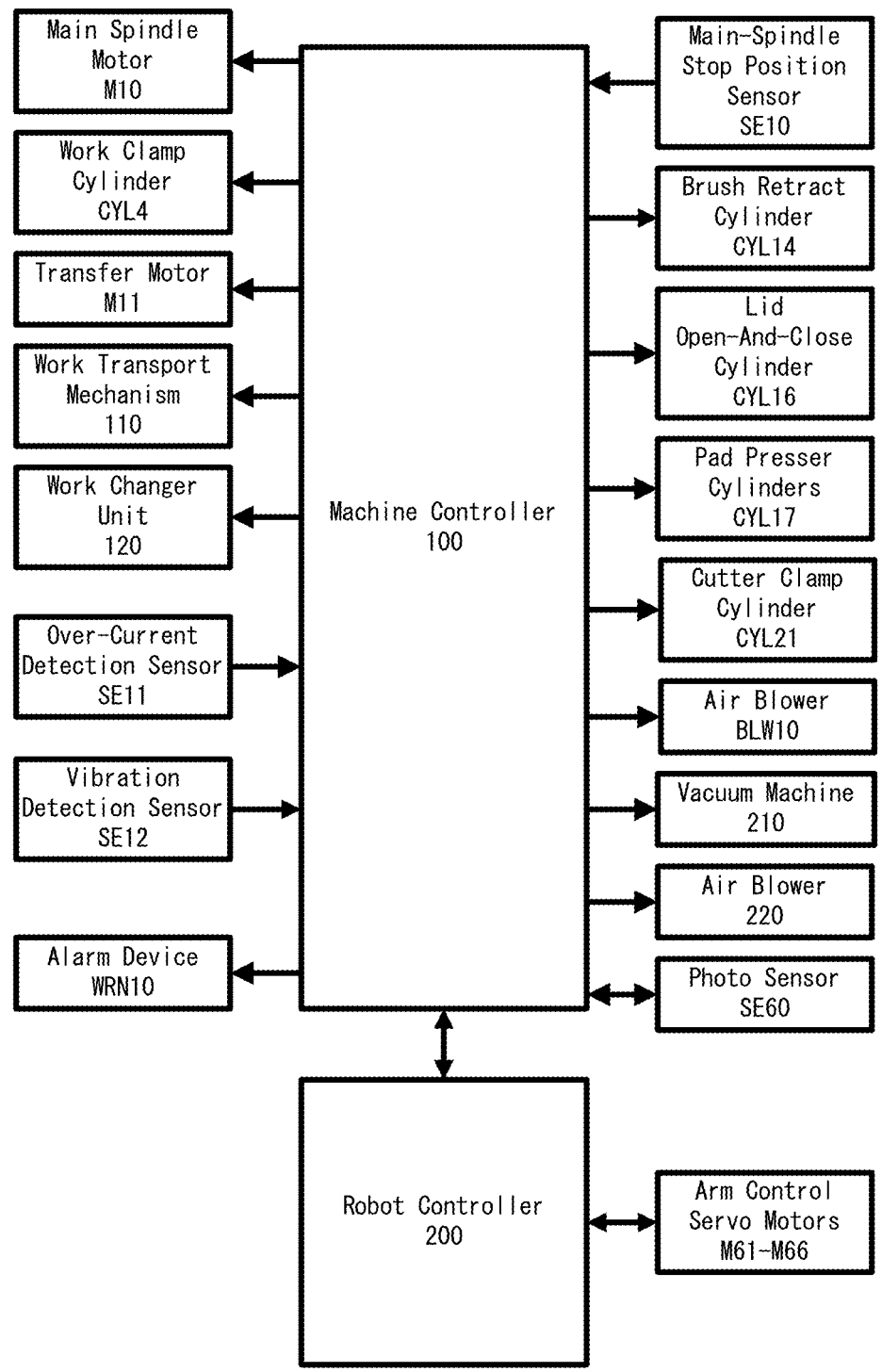
FIG. 7 is a block diagram showing the control system of the equipment according to Embodiment 1.

The control system and the control process of Embodiment 1 will be described hereinafter. As shown in FIG. 7, the control system of Embodiment 1 includes a machine controller 100 that controls the operation of the circular saw cutting machine 1 and a robot controller 200 that controls the operation of the articulated robot 60. These controllers 100 and 200 change circular saws 5 by exchanging signals between the controllers 100 and 200.

In addition to performing outputting and receiving signals to and from the robot controller 200, the machine controller 100 is connected so as to output signals to: the main spindle motor M10; the work clamp cylinder CYL4; the transfer motor M11; a work transport mechanism 110; a work changer unit 120; the brush retraction cylinder CYL14; the lid open-and-close cylinder CYL16; the pad presser cylinders CYL17; the cutter clamp cylinder CYL21; an air blower BLW10; and a warning device WRN10. Moreover, the machine controller 100 is also connected to receive signals from the spindle stop position sensor SE10; an over-current detection sensor SE11; and a vibration detection sensor SE12.

The robot controller 200 is connected to output signals to arm control servo motors M61-M66. It should be noted that the machine controller 100 performs signal input/output to and from the photo sensor SE60 provided on the articulated robot 60 and performs signal output to a vacuum machine 210 and an air blower 220.

Figure 8:
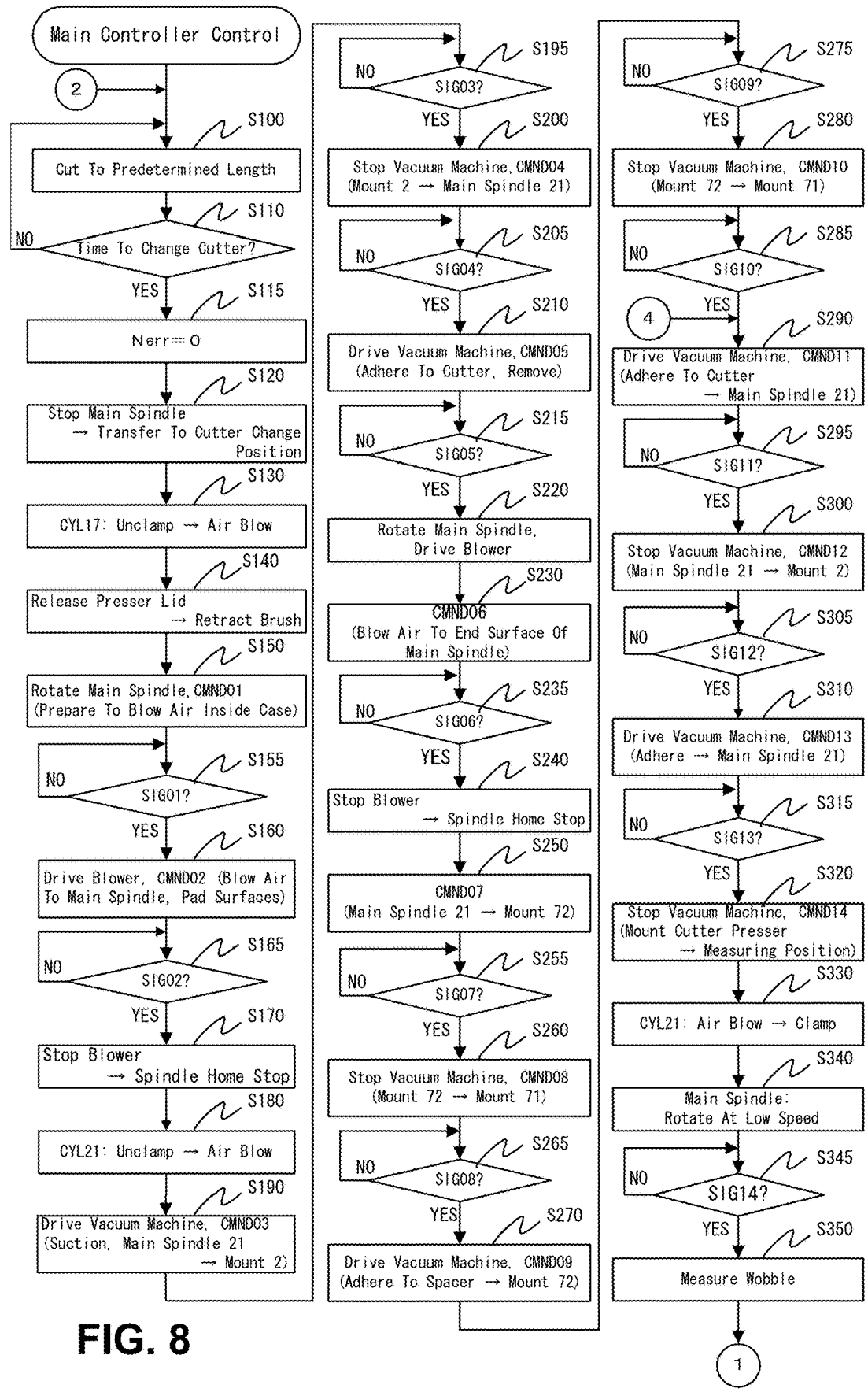
FIG. 8 is a control flowchart for the control process performed by a main controller according to Embodiment 1.

As shown in FIG. 8, the machine controller 100 performs a predetermined-length cutting process to successively cut a steel round bar to a predetermined-length by outputting drive commands to the main spindle motor M10; the work clamp cylinder CYL4; the transfer motor M11; the work transport mechanism 110; and the work changer unit 120 (S100). This results in repeated predetermined-length cutting of the work W as shown in FIG. 11*a*.

While performing the predetermined-length cutting operation, the machine controller 100 performs a cutter change time determination process to determine when to change the cutter based on the operating time of the same cutter accumulated by an internal process and the signals received from the over-current detection sensor SE11 and the vibration detection sensor SE12. The over-current detection sensor SE11 and the vibration detection sensor SE12 are connected to the machine controller 100 with the over-current detection sensor SE11 detecting an over-current due to reduced sharpness of the circular saw 5 and the vibration detection sensor SE12 detecting vibration of the circular saw 5 caused by chipping so as to provide the machine controller 100 with information necessary to determine when to change the cutter from different aspects.

When the machine controller 100 determines that it is time to change the cutter in the "cutter change time determination process" (YES in S110), a cutter change NG counter Nerr is reset (S115). Next, the machine controller 100 outputs a control command to the transfer motor M11 to transfer the machine main body 10 to the cutter change position (S120). As a result, as shown in FIG. 11*b*, the frame of the machine main body 10 is transferred to the cutter change position at the upper end of the guide rail 13.

After stopping the main spindle 21 at the home angle in the cutter change position, the machine controller 100 releases the presser lid 16 by instructing the pad presser cylinders CYL17 to perform unclamping, thus making the presser lid 16 releasable and issuing a command to the lid open-and-close cylinder CYL16 to release the presser lid 16, and then retracts the brush 14 by issuing a command to a brush retraction cylinder CYL14 to retract the brush 14 (S130, S140). In this way, as shown in FIG. 11*c*, the presser lid 16 is released and the brush 14 is retracted to expose the circular saw 5.

In Step S130, the machine controller 100 also drives the air blower BLW10 to blow air to the pad presser cylinders CYL17. As a result, as shown in FIG. 11*d*, air is blown out of the air blow passage 49 of the pad presser cylinders CYL17 to remove the cuttings from the vicinity of the steel balls STB17.

Next, the machine controller 100 drives the main spindle motor M10 to rotate the main spindle 21 and transmits an execution command CMND01 to the robot controller 200 (S150), and then stands by until a completion signal SIG01 is received (S155).

As shown in FIG. 12*a*, the execution command CMND01 is a command for a sequence of actions to transfer the top arm 61 from its initial position to a position opposing the main spindle 21. This sequence of actions is stored in advance in the storage device of the robot controller 200 as teaching actions 01 that correspond to the execution command CMND01. The robot controller 200 outputs control signals to the arm control servo motors M61-M66 to perform the teaching actions 01 and, upon receiving action completion signals from the arm control servo motors M61-M66, transmits a completion signal SIG01 to the machine controller 100.

Triggered by the reception of the completion signal SIG01 (YES in S155), the machine controller 100 drives the air blower 220 to start blowing air from the top arm 61 and transmits an execution command CMND02 to the robot controller 200 (S160), and then stands by until a completion signal SIG02 is received (S165).

As shown in FIG. 12*b*, the execution command CMND02 is a command for a sequence of actions to move the top arm 61, now opposing the main spindle 21, within a predetermined range and stop the top arm 61 in a position where the central axis of the top arm 61 is aligned with the central axis of the main spindle 21 with the top arm 61 spaced apart from the cutter presser piece 50 by a predetermined distance. This sequence of actions is stored in advance in the storage device of the robot controller 200 as teaching actions 02 that correspond to the execution command CMND02. The robot controller 200 outputs control signals to the arm control servo motors M61-M66 to perform the teaching actions 02 and, upon receiving action completion signals from the arm control servo motors M61-M66, transmits a completion signal SIG02 to the machine controller 100.

After the top arm 61 performs the teaching actions 02 with the air blower 220 driven to blow air and remove the cuttings for a predetermined time period, the cutter presser piece 50 is ready to be removed.

Triggered by the reception of the completion signal SIG02 (YES in S165), the machine controller 100 stops the operation of the air blower 220 and issues stop commands to the main spindle motor M10 and the brake 25, based on the signal from the spindle stop position sensor SE10, to stop the main spindle 21 where the rotational angle of the main spindle is the predetermined home angle (i.e., to perform "main spindle home stop") (S170). In this way, as shown in FIG. 11*f*, the circular saw 5 is stopped at an angle where the pin insertion holes 5*b* are oriented at predetermined angles.

Subsequently, the machine controller 100 instructs the cutter clamp cylinder CYL21 to perform unclamping so as to allow for the removal of the cutter presser piece 50 and also drives the air blower BLW10 to blow air to the cutter clamp cylinder CYL21 (S180). As a result, as shown in FIG. 11*e*, air is blown out of the air blow passage 43 of the cutter clamp cylinder CYL21 to remove the cuttings from the vicinity of the steel balls STB21.

Next, the machine controller 100 drives the vacuum machine 210 and transmits an execution command CMND03 to the robot controller 200 (S190), and then stands by until a completion signal SIG03 is received (S195).

As shown in FIG. 12*c*, the execution command CMND03 is a command for a sequence of actions to: advance the top arm 61 to press the suction members 62 against the front end face of the cutter presser piece 50; pull out the cutter presser piece 50 in the forward direction without misaligning the central axis of the top arm 61; and lower the cutter presser piece 50 adhering or attached to the suction members 62 while controlling the central axis and the rotation angle thereof so as to align the pins 51 and the pin holes of the cutter presser piece 50 with the pins and the holes in the cutter presser piece mount 2. This sequence of actions is stored in advance in the storage device of the robot controller 200 as teaching actions 03 that correspond to the execution command CMND03. The robot controller 200 outputs control signals to the arm control servo motors M61-M66 to perform the teaching actions 03 and, upon receiving action completion signals from the arm control servo motors M61-

M66, transmits a completion signal SIG03 to the machine controller 100. According to this embodiment, by causing the suction members 62 to adhere to the cutter presser piece 50 with the main spindle 21 stopped at the home angle, it is possible to lower the cutter presser piece 50 adhering to the top arm so as to accurately align the pins 51 and the pin holes of the cutter presser piece 50 with the pins and the holes in the cutter presser piece mount 2.

This allows the cutter presser piece 50 to be removed from the main spindle 21 and transferred onto the cutter presser piece mount 2.

Triggered by the reception of the completion signal SIG03 (YES in S195), the machine controller 100 stops the suction of the vacuum machine 200 and transmits an execution command CMND04 to the robot controller 200 (S200), and then stands by until a completion signal SIG04 is received (S205). By turning off the vacuum machine 210, the cutter presser piece 50, which adhered to the top arm 61, is correctly mounted onto the cutter presser piece mount 2.

As shown in FIG. 12d, conversely to the actions of the teaching actions 03, the execution command CMND04 is a command for a sequence of actions to transfer the top arm 61 from the position where it opposes the cutter presser piece mount 2 to the position where it opposes the main spindle 21. This sequence of actions is stored in advance in the storage device of the robot controller 200 as teaching actions 04 that correspond to the execution command CMND04. The robot controller 200 outputs control signals to the arm control servo motors M61-M66 to perform the teaching actions 04 and, upon receiving action completion signals from the arm control servo motors M61-M66, transmits a completion signal SIG04 to the machine controller 100.

Triggered by the reception of the completion signal SIG04 (YES in S205), the machine controller 100 drives the vacuum machine 210 and transmits an execution command CMND05 to the robot controller 200 (S210), and then stands by until a completion signal SIG05 is received (S215).

As shown in FIG. 12e, the execution command CMND05 is a command for a sequence of actions to: advance the top arm 61 to press the suction members 62 against the front end face of the circular saw 5; and pull out the circular saw 5 in the forward direction without misaligning the central axis of the top arm 61. This sequence of actions is stored in advance in the storage device of the robot controller 200 as teaching actions 05 that correspond to the execution command CMND05. The robot controller 200 outputs control signals to the arm control servo motors M61-M66 to perform the teaching actions 05 and, upon receiving action completion signals from the arm control servo motors M61-M66, transmits a completion signal SIG05 to the machine controller 100.

Triggered by the reception of the completion signal SIG05 (YES in S215), the machine controller 100 drives the main spindle motor M10 to rotate the main spindle 21 and drives the air blower 220 to start blowing air from the top arm 61 (S220). Next, the machine controller 100 transmits an execution command CMND06 to the robot controller 200 (S230), and then stands by until a completion signal SIG06 is received (S235).

As shown in FIG. 12f, the execution command CMND06 is a command for a sequence of actions to: move the top arm 61 within a predetermined range with the top arm 61 to which the circular saw 5 adheres and opposing the main spindle 21; and stop the top arm 61 in a position where the central axis of the top arm 61 is aligned with the central axis of the main spindle 21 with the top arm 61 spaced apart from the main spindle 21 by a predetermined distance. This sequence of actions is stored in advance in the storage device of the robot controller 200 as teaching actions 06 that correspond to the execution command CMND06.

The robot controller 200 outputs control signals to the arm control servo motors M61-M66 to perform the teaching actions 06 and, upon receiving action completion signals from the arm control servo motors M61-M66, transmits a completion signal SIG06 to the machine controller 100. Air blows out of the mounting hole 5a of the circular saw 5 to remove the cuttings from the end surface of the main spindle.

Triggered by the reception of the completion signal SIG06 (YES in S235), the machine controller 100 stops the air blower 220 and issues stop commands to the main spindle motor M10 and the brake 25, based on the signal from the spindle stop position sensor SE10, to stop the main spindle 21 where the rotational angle of the main spindle is the predetermined home angle (i. e., to perform "main spindle home stop") (S240). In this way, as shown in FIG. 11f, the circular saw 5 is stopped at an angle where the pin insertion holes 5b are oriented at predetermined angles.

Subsequently, the machine controller 100 transmits an execution command CMND07 to the robot controller 200 (S250), and then stands by until a completion signal SIG07 is received (S255).

As shown in FIG. 12g, the execution command CMND07 is a command for a sequence of actions to: transfer the top arm 61, to which the circular saw 5 adheres, from the position where it opposes the main spindle 21 to the used cutter mount 72 of the cutter stocker 70; and lower the top arm 61 with the circular saw 5 adhering thereto while controlling the central axis and the rotation angle thereof so as to align the four pin insertion holes 5b of the circular saw 5 with the four pillars 44 on the used cutter mount 72. This sequence of actions is stored in advance in the storage device of the robot controller 200 as teaching actions 07 that correspond to the execution command CMND07. The robot controller 200 outputs control signals to the arm control servo motors M61-M66 to perform the teaching actions 07 and, upon receiving action completion signals from the arm control servo motors M61-M66, transmits a completion signal SIG07 to the machine controller 100. This embodiment, by having the circular saw 5 adhere to the top arm 61 while the main spindle 21 is stopped at the home angle, can accurately control the lowering of the top arm 61 with the circular saw 5 adhering thereto while controlling the central axis and the rotation angle thereof so as to align the four pin insertion holes 5b of the circular saw 5 with the four pillars 44 on the used cutter mount 72. This allows the used circular saw 5used to be removed from the main spindle 21 and transferred onto the used cutter mount 72 of the cutter stocker 70.

Triggered by the reception of the completion signal SIG07 (YES in S255), the machine controller 100 stops the vacuum machine 210 and transmits an execution command CMND08 to the robot controller 200 (S260), and then stands by until a completion signal SIG08 is received (S265).

As shown in FIG. 12h, the execution command CMND08 is a command for a sequence of actions to transfer the top arm 61 from the used cutter mount 72 to the new cutter mount 71 so as to be able to pick up the spacer disposed on the new cutter 5new. This sequence of actions is stored in advance in the storage device of the robot controller 200 as teaching actions 08 that correspond to the execution command CMND08.

The robot controller 200 outputs control signals to the arm control servo motors M61-M66 to perform the teaching actions 08 and, upon receiving action completion signals from the arm control servo motors M61-M66, transmits a completion signal SIG08 to the machine controller 100.

Triggered by the reception of the completion signal SIG08 (YES in S265), the machine controller 100 drives the vacuum machine 210 and transmits an execution command CMND09 to the robot controller 200 (S270), and then stands by until a completion signal SIG09 is received (S275).

As shown in FIG. 12*i*, the execution command CMND09 is a command for a sequence of actions to cause the spacer to adhere to the top arm 61 and transfer it from the new cutter mount 71 to the used cutter mount 72. This sequence of actions is stored in advance in the storage device of the robot controller 200 as teaching actions 09 that correspond to the execution command CMND09. The robot controller 200 outputs control signals to the arm control servo motors M61-M66 to perform the teaching actions 09 and, upon receiving action completion signals from the arm control servo motors M61-M66, transmits a completion signal SIG09 to the machine controller 100.

Triggered by the reception of the completion signal SIG09 (YES in S275), the machine controller 100 stops the vacuum machine 210 and transmits an execution command CMND10 to the robot controller 200 (S280), and then stands by until a completion signal SIG10 is received (S285).

As shown in FIG. 13*a*, the execution command CMND10 is a command for a sequence of actions to transfer the top arm 61 from the used cutter mount 72 to the new cutter mount 71 and lower it to a position where it can pick up the topmost new cutter 5*new*. This sequence of actions is stored in advance in the storage device of the robot controller 200 as teaching actions 10 that correspond to the execution command CMND10. The robot controller 200 outputs control signals to the arm control servo motors M61-M66 to perform the teaching actions 10 and, upon receiving action completion signals from the arm control servo motors M61-M66, transmits a completion signal SIG10 to the machine controller 100.

Triggered by the reception of the completion signal SIG10 (YES in S285), the machine controller 100 drives the vacuum machine 210 and transmits an execution command CMND11 to the robot controller 200 (S290), and then stands by until a completion signal SIG11 is received (S295).

As shown in FIG. 13*b*, the execution command CMND11 is a command for a sequence of actions to: remove the new cutter 5*new* adhering to the top arm 61 from the new cutter mount 71 of the cutter stocker 70; move it to where it can be mounted on the main spindle 21; align the central axis of the top arm 61 with the central axis of the main spindle 21; and mount the new cutter 5*new* on the cutter mounting member 31 while controlling the rotation angle of the top arm 61 to orient the four pin insertion holes 5*b* of the new cutter 5*new* to the angles that correspond to the two pins 32 and two pin holes 34 on the front end face 32 of the cutter mounting member 31. This sequence of actions is stored in advance in the storage device of the robot controller 200 as teaching actions 11 that correspond to the execution command CMND11. The robot controller 200 outputs control signals to the arm control servo motors M61-M66 to perform the teaching actions 11 and, upon receiving action completion signals from the arm control servo motors M61-M66, transmits a completion signal SIG11 to the machine controller 100. In this embodiment, in this sequence of actions, as the main spindle 21 is stopped at the home angle, the top arm 61 can be accurately controlled to oppose the main spindle 21 by controlling the rotation angle of the top arm 61. This makes it possible to pass the new cutter 5*new* to the main spindle 21.

Triggered by the reception of the completion signal SIG11 (YES in S295), the machine controller 100 stops the vacuum machine 210 and transmits an execution command CMND12 to the robot controller 200 (S300), and then stands by until a completion signal SIG12 is received (S305).

As shown in FIG. 13*c*, the execution command CMND12 is a command for a sequence of actions to: transfer and orient the top arm 61 downward directly above the cutter presser piece mount 2 after the new cutter 5*new* is mounted on the main spindle 21; and lower it until the suction members 62 are brought into abutment with the cutter presser piece 50. This sequence of actions is stored in advance in the storage device of the robot controller 200 as teaching actions 12 that correspond to the execution command CMND12. The robot controller 200 outputs control signals to the arm control servo motors M61-M66 to perform the teaching actions 12 and, upon receiving action completion signals from the arm control servo motors M61-M66, transmits a completion signal SIG12 to the machine controller 100.

Triggered by the reception of the completion signal SIG12 (YES in S305), the machine controller 100 drives the vacuum machine 210 and transmits an execution command CMND13 to the robot controller 200 (S310), and then stands by until a completion signal SIG13 is received (S315).

As shown in FIG. 13*d*, in the reverse of the teaching actions 03, the execution command CMND13 is a command for a sequence of actions to: pull upward the top arm 61 to which the cutter presser piece 50 adheres and transfer it to a position where it opposes the main spindle 21; transfers it toward the cutter mounting member 31 with the central axis thereof aligned with the central axis of the main spindle 21 while controlling the rotation angle; and fit the cutter presser piece 50 so as to be held against the new cutter 5*new*. This sequence of actions is stored in advance in the storage device of the robot controller 200 as teaching actions 13 that correspond to the execution command CMND13. The robot controller 200 outputs control signals to the arm control servo motors M61-M66 to perform the teaching actions 13 and, upon receiving action completion signals from the arm control servo motors M61-M66, transmits a completion signal SIG13 to the machine controller 100. This allows for attaching the cutter presser piece 50, which has been picked up from the cutter presser piece mount 2, to the cutter mounting member 31 of the main spindle 21.

Triggered by the reception of the completion signal SIG13 (YES in S315), the machine controller 100 stops the vacuum machine 210 and transmits an execution command CMND14 to the robot controller 200 (S320). Subsequently, the air blower BLW10 is activated to blow air to the cutter clamp cylinder CYL21, and then the cutter clamp cylinder CYL21 is instructed to perform clamping (S330). Moreover, after a command is issue to the main spindle motor M10 to rotate at low speed (S340), it is determined whether or not a completion signal SIG14 has been received (S345).

As shown in FIG. 13*e*, the execution command CMND14 is a command for a sequence of actions to radially transfer, by a predetermined distance, the top arm 61 from where the central axis of the top arm 61 is aligned with the central axis of the main spindle 21. This sequence of actions is stored in advance in the storage device of the robot controller 200 as teaching actions 14 that correspond to the execution command CMND14. The robot controller 200 outputs control signals to the arm control servo motors M61-M66 to perform the teaching actions 14 and, upon receiving action completion signals from the arm control servo motors M61-M66, transmits a completion signal SIG14 to the machine controller 100. This makes it possible to measure the distance between the new cutter 5*new* and the top arm 6 by emitting light via the detection hole 63 in the top arm 61 and receiving its reflected light.

Upon confirming the reception of the completion signal SIG14 (YES in S345), the machine controller 100 measures the wobble of the circular saw by turning ON the photo sensor SE60, receiving distance measurements for a predetermined period of time, and then stopping the main spindle motor M10 (S350).

Figure 9:
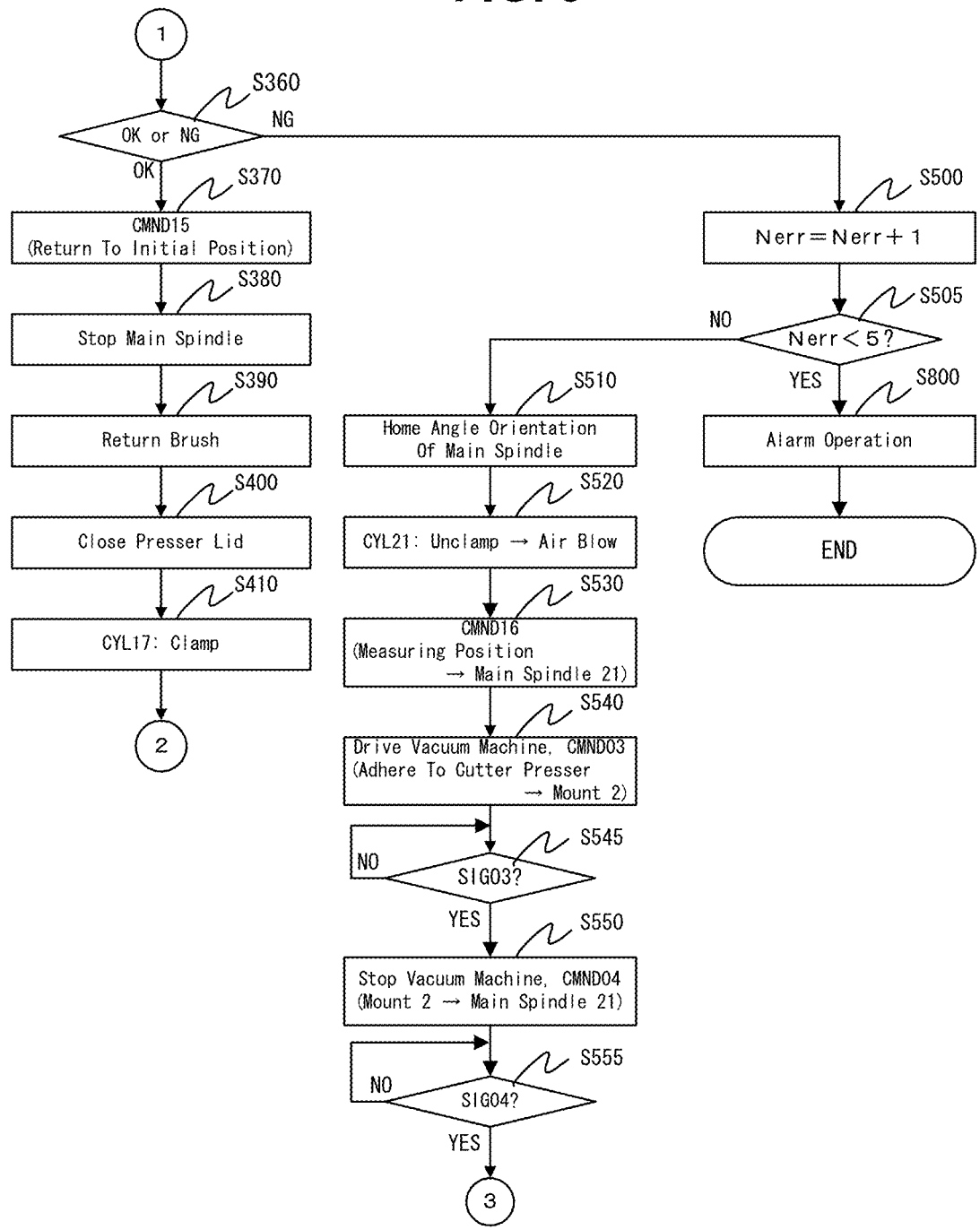
FIG. 9 is another control flowchart for the control process performed by the main controller according to Embodiment 1.
Figure 10:
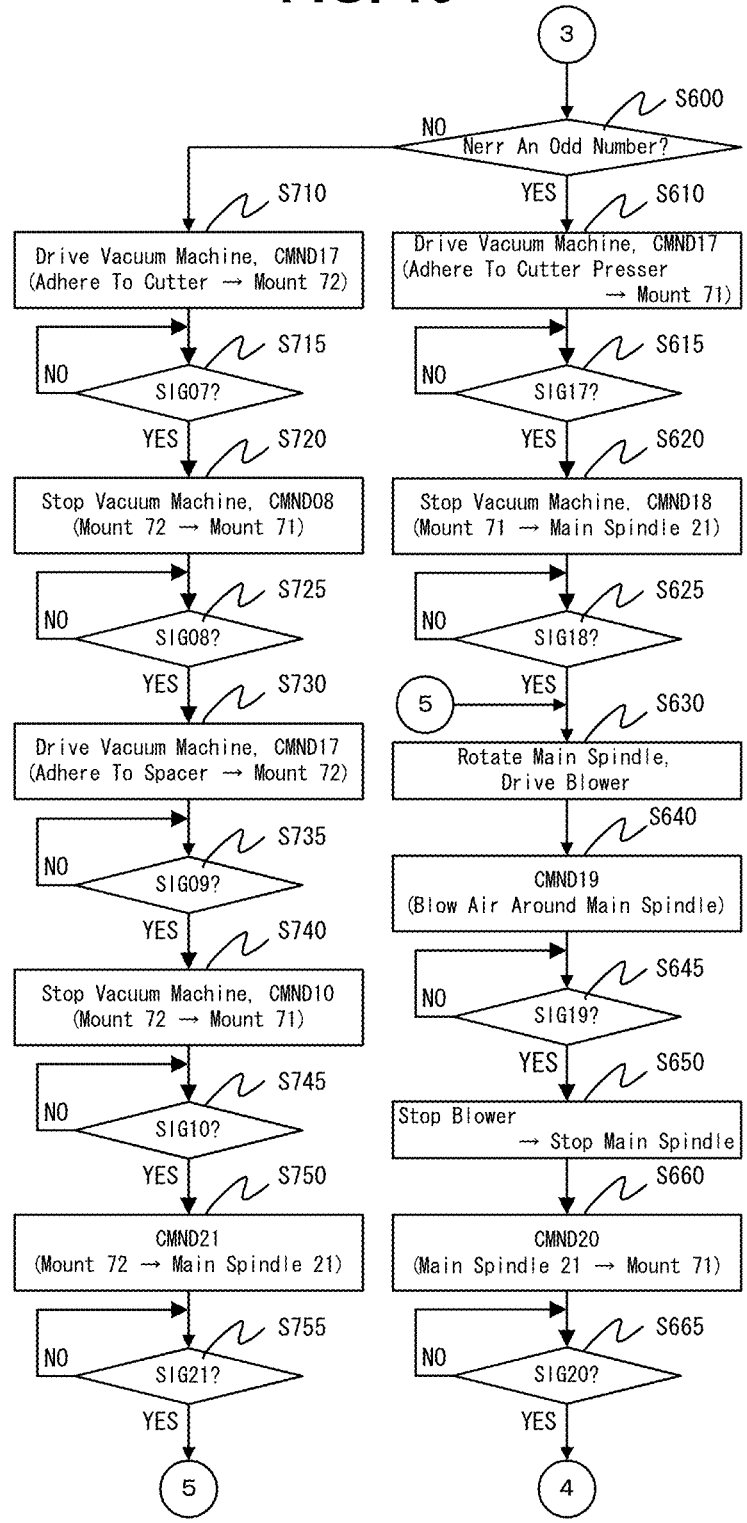
FIG. 10 is another control flowchart for the control process performed by the main controller according to Embodiment 1.

Subsequently, as shown in FIG. 9, determination of wobble is performed by the machine controller 100 (thereby embodying a wobble determination unit) by determining whether or not the variations in the results of distance detection during that time exceed a wobble reference value (S360). If it is determined that the wobble reference value is not exceeded (OK in S360), an execution command CMND15 is transmitted to the robot controller 200 (S370); the main spindle motor M10 is stopped (S380); the brush retract cylinder CYL14 is commanded to bring the brush 14 into abutment with the circular saw 5*new* (S390); the lid open-and-close cylinder CYL16 is then commanded to close the presser lid 16 (S400); and the pad presser cylinders CYL17 is commanded to perform clamping (S410) to return the process to the operation to cut a steel round bar to a predetermined-length.

Meanwhile, if it is determined that the variations in the results of distance detection exceed the wobble reference value (NG in S360), the machine controller 100 increments the cutter change NG counter Nerr (S500) and also determines if it is Nerr>5 (S505). If Nerr>5 (YES in S505), the alarm device WRN10 is activated and an alarm operation is performed in which the occurrence of an abnormal event is stored in a manner that can be read out (S800), whereupon the process is terminated.

If the determination in Sep S505 is NO, the machine controller 100 performs home angle orientation of the main spindle (S510) as in Step S150. In this way, as shown in FIG. 11*f*, the circular saw 5 is stopped at an angle where the pin insertion holes 5*b* are oriented at predetermined angles.

Next, the machine controller 100 instructs the cutter clamp cylinder CYL21 to perform unclamping and also drives the air blower BLW10 to blow air to the cutter clamp cylinder CYL21 (S520). As a result, as shown in FIG. 11*e*, air is blown out of the air blow passage 43 of the cutter clamp cylinder CYL21 to remove the cuttings from the vicinity of the steel balls STB21.

As the next step, the machine controller 100 transmits an execution command CMND16 to the robot controller 200 (S530), and then stands by until a completion signal SIG16 is received (S535).

As shown in FIG. 14*a*, the execution command CMND16 is a command for a sequence of actions to transfer the top arm 61 from the wobble measuring position to a position opposing the center of the main spindle 21. This sequence of actions is stored in advance in the storage device of the robot controller 200 as teaching actions 16 that correspond to the execution command CMND16. The robot controller 200 outputs control signals to the arm control servo motors M61-M66 to perform the teaching actions 16 and, upon receiving action completion signals from the arm control servo motors M61-M66, transmits a completion signal SIG16 to the machine controller 100.

In this way, after the top arm 61 is caused to oppose the unclamped cutter presser piece 50, the machine controller 100 performs the same steps as S190-S205 (S540-S555), causes the robot controller 200 to perform the teaching actions 03 and 04 to remove the cutter presser piece 50 so that the circular saw 5 can be removed.

Next, the machine controller 100 determines whether or not the value of the cutter change NG counter Nerr is an odd number (S600). If it is an odd number (YES in S600), the machine controller 100 drives the vacuum machine 210 and transmits an execution command CMND17 to the robot controller 200 (S610), and then stands by until a completion signal SIG17 is received (S615).

As shown in FIG. 14*c*, the execution command CMND17 is a command for a sequence of actions to: advance the top arm 61 to press the suction members 62 against the front end face of the circular saw 5; pull out the circular saw 5 in the forward direction without misaligning the central axis of the top arm 61; transfer the removed circular saw 5 to a position where it can be mounted to the new cutter mount 71 of the cutter stocker 70; and lower the top arm 61 with the circular saw 5 adhering thereto while controlling the central axis and the rotation angle thereof so as to align the four pin insertion holes 5*b* of the circular saw 5 with the four pillars 73 on the new cutter mount 71. This sequence of actions is stored in advance in the storage device of the robot controller 200 as teaching actions 17 that correspond to the execution command CMND17. The robot controller 200 outputs control signals to the arm control servo motors M61-M66 to perform the teaching actions 17 and, upon receiving action completion signals from the arm control servo motors M61-M66, transmits a completion signal SIG17 to the machine controller 100.

While the teaching actions 17 constitute a series of actions for removing and mounting the circular saw 5 onto the cutter stocker 70, unlike the teaching actions 07, this series of action returns the circular saw 5 to the new cutter mount 71.

Triggered by the reception of the completion signal SIG17 (YES in S615), the machine controller 100 stops the vacuum machine 210 and transmits an execution command CMND18 to the robot controller 200 (S620), and then stands by until a completion signal SIG18 is received (S625).

As shown in FIG. 14*d*, the execution command CMND18 is a command for a sequence of actions to transfer the top arm 61 from where it opposes the new cutter mount 71 to a position where it opposes the main spindle 21. This sequence of actions is stored in advance in the storage device of the robot controller 200 as teaching actions 18 that correspond to the execution command CMND18. The robot controller 200 outputs control signals to the arm control servo motors M61-M66 to perform the teaching actions 18 and, upon receiving action completion signals from the arm control servo motors M61-M66, transmits a completion signal SIG18 to the machine controller 100.

Triggered by the reception of the completion signal SIG18 (YES in S625), the machine controller 100 drives both the main spindle motor M10 and the air blower 220 (S630). Next, the machine controller 100 transmits an execution command CMND19 to the robot controller 200 (S640), and then stands by until a completion signal SIG19 is received (S645).

As shown in FIG. 14*e*, the execution command CMND19 is a command for a sequence of actions to extensively move the top arm 61, now opposing the main spindle 21, within a predetermined range and stop the top arm 61 in a position where the central axis of the top arm 61 is aligned with the central axis of the main spindle 21. This sequence of actions is stored in advance in the storage device of the robot controller 200 as teaching actions 19 that correspond to the execution command CMND19. The robot controller 200 outputs control signals to the arm control servo motors M61-M66 to perform the teaching actions 19 and, upon receiving action completion signals from the arm control servo motors M61-M66, transmits a completion signal SIG19 to the machine controller 100.

After the top arm 61 performs the teaching actions 19 with the air blower 220 driven to blow air, the cuttings are removed from the cutter mounting member 31 for a predetermined time period. With no circular saw 5 adhering or attached to the top arm at this time, no interference occurs to enable more extensive movement of the top arm 61 and thus more meticulous removal of cuttings.

Triggered by the reception of the completion signal SIG19 (YES in S645), the machine controller 100 stops the air blower 220 and issues stop commands to the main spindle motor M10 and the brake 25, based on the signal from the spindle stop position sensor SE10, to stop the main spindle 21 where the rotational angle of the main spindle is the predetermined home angle (i.e., perform "main spindle home stop") (S650). In this way, as shown in FIG. 11*f*, the circular saw 5 is stopped at an angle where the pin insertion holes 5*b* are oriented at predetermined angles.

Subsequently, the machine controller 100 transmits an execution command CMND20 to the robot controller 200 (S660), and then stands by until a completion signal SIG20 is received (S665).

As shown in FIG. 14*f*, the execution command CMND20 is a command for a sequence of actions to transfer the top arm 61, now opposing the main spindle 21, to the new cutter mount 71 and lower it to a position where it can pick up the topmost new cutter 5*new*. This sequence of actions is stored in advance in the storage device of the robot controller 200 as teaching actions 20 that correspond to the execution command CMND20. The robot controller 200 outputs control signals to the arm control servo motors M61-M66 to perform the teaching actions 20 and, upon receiving action completion signals from the arm control servo motors M61-M66, transmits a completion signal SIG20 to the machine controller 100.

Triggered by the reception of the completion signal SIG20 (YES in S665), the machine controller 100 returns to Step S290 (so as to serve as a wobble re-determination unit) and, as shown in FIG. 14*g*, causes the robot controller 200 to perform the teaching actions 11-14 and so on to perform cutter change operation again and perform the wobble determination shown in FIG. 14*h*.

Meanwhile, if the value of the cutter change NG counter Nerr is not an odd number (NO in S600), the machine controller 100 drives the vacuum machine 210 and transmits an execution command CMND07 to the robot controller 200 (S710) to perform the teaching actions 07, transferring the cutter presser piece 50 to the cutter presser piece mount 2. Then, upon receiving the completion signal SIG07 (YES in S715), the same steps as Steps S260-285 are performed (S720-S745) to cause the robot controller 200 to perform the teaching actions 08-10. In this way, the circular saw 5*new*, failing the second cutter change, is mounted on the used cutter mount 72 and the spacer mounted on the next new circular saw 5*new* is mounted on the new circular saw 5*new* transferred to the used cutter mount 72.

Triggered by the reception of the completion signal SIG10 (YES in S745), the machine controller 100 transmits an execution command CMND21 to the robot controller 200 (S750), and then stands by until a completion signal SIG21 is received (S755).

As shown in FIG. 15*d*, the execution command CMND21 is a command for a sequence of actions to transfer the top arm 61, which has completed the transfer of the spacer, to a position opposing the main spindle 21. This sequence of actions is stored in advance in the storage device of the robot controller 200 as teaching actions 21 that correspond to the execution command CMND21. The robot controller 200 outputs control signals to the arm control servo motors M61-M66 to perform the teaching actions 21 and, upon receiving action completion signals from the arm control servo motors M61-M66, transmits a completion signal SIG21 to the machine controller 100.

Triggered by the reception of the completion signal SIG21 (YES in S755), the machine controller 100 returns to Step S630 and later, performs elaborate removal of the cuttings according to the teaching actions 19 as shown in FIG. 15*e*, then mounts a new cutter on the main spindle 21, and secure it with the cutter presser piece 50 as shown in FIGS. 15*f* to 15*g*, before subsequently performing the wobble determination shown in FIG. 15*h*.

As described above, the machine controller 100 performs two changing operations of circular saws 5*new* picked up from the top of the new cutter mount 71; for the third changing operation, however, the circular saw is replaced with another new circular saw 5*new* to perform a subsequent changing operation. As a result, if wobble has occurred due to a defect in the circular saw 5*new*, a further new circular saw 5*new* may be used for cutter change, which allows for smooth cutter change.

Meanwhile, if the result of the wobble determination of the third circular saw 5*new* is NG, an alarm is issued (S800), assuming the occurrence of certain conditions, such as cuttings lodged in the cutter presser piece 50 or the front end face 32 of the main spindle 21, rather than attributing the cause of the problem to the saws. This may prompt a worker to take appropriate measures without continuing futile cutter changing.

As described above, this embodiment can completely automate the change of cutters in the circular saw cutting machine, making nighttime operation possible without deploying workers.

Having described embodiments of the present invention as above, the present invention is not limited to these embodiments but may be modified in various manners without departing from the scope of the invention.

For example, while the pins 51 are provided on the cutter presser piece 50 in the foregoing embodiment, four pins may be provided on the front end face 32 of the cutter mounting member 31. Alternatively, at least one pin may be provided on the cutter mounting member 31 with the remainder provided on the cutter presser piece 50. In this way, the least one pin provided on the cutter mounting member 31 may serve as a whirl-stop when a circular saw 5 is attached, thereby enabling accurate attachment of the cutter presser piece 50, etc., in the subsequent steps.

Furthermore, the present invention is not only applicable to a hydraulic mechanism to pull in and fix the cutter presser piece 50 and also release it, but also to a ball screw mechanism capable of to pull in and fix the cutter presser piece 50 and also release it. To ensure swiftness and reliability of operation, however, a hydraulic mechanism is preferable as in the foregoing embodiment. Moreover, the present invention can also be used to provide the ability to automatically change cutters for a circular saw cutting machine for cutting steel piping and other types of cutting.

INDUSTRIAL APPLICABILITY

The present invention can be applied to circular saw cutting machines.

What is claimed is:

1. A circular saw cutting machine comprising:
   a main spindle, a main spindle motor, and a power transmission mechanism, a frame movably guided on a guide rail between a cutting position and a withdrawal position under the transfer control of a transfer motor, and a cutter mount mechanism for mounting a circular saw on a mounting shaft provided at a top end of the main spindle so that the circular saw integrally rotates with the main spindle without rotationally shifting relative to the main spindle;
   wherein the circular saw includes a mounting hole through which the mounting shaft can be inserted and a plurality of pin insertion holes equidistantly arranged in concentric positions around a center of the mounting hole,
   wherein the cutter mount mechanism comprises:
   a pull-in fixing mechanism including a cutter presser piece mounted to interpose the circular saw between the cutter presser piece and a front end face of the main spindle, a plurality of pins capable of being inserted through the pin insertion holes of the circular saw in concentric positions around a center of the mounting shaft of the main spindle, a plurality of pin holes into which the plurality of pins can be inserted, wherein each one pin, respectively, of the plurality of pins is provided on one of either a rear face of the cutter presser piece or the front end face of the main spindle and a corresponding pin hole to said one pin is provided on the other of the rear face of the cutter presser piece and the front end face of the main spindle to make pairs with the pins, wherein at least one of the plurality of pins is provided on the front end face of the main spindle, and wherein the cutter presser piece is pulled in toward the front end face of the main spindle to be fixed while the plurality of pins are inserted in the paired pin holes with the plurality of pins inserted through the plurality of pin insertion holes of the circular saw; and
   a pull-in release mechanism for releasing the fixing of the cutter presser piece by the pull-in fixing mechanism so that the cutter presser piece can be removed from the main spindle; and
   wherein the circular saw cutting machine further comprises a spindle home position stopping mechanism that includes a brake for stopping the rotation of the main spindle and a sensor for detecting a rotational angle of the main spindle, the main home position stopping mechanism stopping the main spindle in a predetermined home angle condition by controlling the main spindle motor and the brake based on the rotational angle detected by the sensor.

2. The circular saw cutting machine according to claim 1, further comprising:
   a cutter stocker including a new cutter mount on which new cutters are disposed and a used cutter mount on which used cutters are disposed, each of the new cutter mount and the used cutter mount having erected thereon a plurality of pillars that correspond to the plurality of pin insertion holes provided in the circular saw, and an articulated robot for passing cutters between the cutter stocker and the circular saw cutting machine;
   a cutter presser piece mount provided with pin holes or pins that are paired with the pins or the pin holes provided in the cutter presser piece, the cutter presser piece mount being installed within a working range of the articulated robot;
   a cutter change preparation mechanism for controlling the transfer motor to transfer the frame to a cutter change position, operating the spindle home position stopping mechanism to stop the main spindle in the predetermined home angle condition, and operating the pull-in release mechanism to place the cutter presser piece in a removable condition;
   a cutter change command unit for causing the articulated robot to: remove the cutter presser piece, which is placed in a removable condition by the cutter change preparation mechanism, from the main spindle and transfer the cutter presser piece to the cutter presser piece mount; remove the circular saw from the main spindle after the cutter presser piece is removed from the main spindle and transfer the circular saw to the used cutter mount; remove a cutter from the new cutter mount and mount the cutter to the main spindle; and pick up the cutter presser piece transferred to the cutter presser piece mount and mount the cutter presser piece to the main spindle; and
   a cutter fixing unit for operating the pull-in fixing mechanism to fix the cutter while the new cutter and the cutter presser piece are mounted to the main spindle by the cutter change command unit.

3. The circular saw cutting machine according to claim 2, wherein: the articulated robot includes an air blow unit for blowing air and the cutter change command unit is configured to operate the air blow unit to remove cuttings before removing the cutter presser piece from the main spindle.

4. The circular saw cutting machine according to claim 3, wherein: the articulated robot includes a distance measurement unit for measuring a distance; and
   wherein the circular saw cutting machine further includes a wobble determination unit for determining whether or not a wobble greater than or equal to a predetermined level occurs in a newly mounted circular saw by operating the distance measurement unit of the articulated robot, the determination being made while the main spindle motor is driven to rotate the newly mounted circular saw after the cutter is fixed by the cutter fixing unit.

5. The circular saw cutting machine according to claim 4, further comprising:
   a cutter re-change preparation mechanism for operating the spindle home position stopping mechanism to stop the main spindle in the predetermined home angle condition if the wobble determination unit determines that a wobble greater than or equal to the predetermined level occurs in the newly mounted circular saw;
   a cutter re-change command unit for causing the articulated robot to: remove the cutter presser piece, which is placed in a removable condition by the cutter re-change preparation mechanism, from the main spindle and transfer the cutter presser piece to the cutter presser piece mount; remove the newly mounted circular saw from the main spindle after the cutter presser piece is removed from the main spindle and return the newly mounted circular saw to the new cutter mount of the cutter stocker; remove the cutter from the new cutter mount and mount the cutter to the main spindle after operating the air blow unit to remove cuttings from the main spindle with the circular saw removed therefrom; pick up the cutter presser piece transferred to the cutter presser piece mount and mount the cutter presser piece to the main spindle; and a cutter re-fixing unit for operating the pull-in fixing mechanism to fix the cutter with the new cutter and the cutter presser piece mounted to the main spindle by the cutter re-change command unit.

6. The circular saw cutting machine according to claim 5, further comprising:

a wobble re-determination unit for determining whether or not a wobble greater than or equal to the predetermined level occurs in the newly mounted circular saw by operating the distance measurement unit of the articulated robot, the determination being made while the main spindle motor is driven to rotate the newly mounted circular saw after the cutter is fixed by the cutter re-fixing unit; and a newer cutter change unit for, if the wobble re-determination unit determines that a wobble greater than or equal to the predetermined level occurs, causing the cutter change preparation mechanism, the cutter change command unit, and the cutter fixing unit to perform a cutter change operation to replace the circular saw, determined to have a wobble greater than or equal to a predetermined level, with a newer cutter as a used cutter.

7. The circular saw cutting machine according to claim 6, further comprising:

a warning device for stopping said cutter change operation and performing warning operation if it is determined that a wobble greater than or equal to the predetermined level occurs even after the newer cutter change unit performs cutter change operation predetermined times.

8. The circular saw cutting machine according to claim 2, further comprising:

a main controller for determining when to change a cutter and for controlling the transfer motor, the main spindle motor, the brake, the pull-in fixing mechanism, the pull-in release mechanism, the main spindle home position stopping mechanism, the air blow unit, and the distance measurement unit; and a robot controller for controlling the articulated robot, the robot controller being distinct from the main controller; and wherein the robot controller and the main controller are configured to perform cutter change by exchanging signals therebetween.

9. The circular saw cutting machine according to claim 7, further comprising:

a main controller for determining when to change a cutter and for controlling the transfer motor, the main spindle motor, the brake, the pull-in fixing mechanism, the pull-in release mechanism, the main spindle home position stopping mechanism, the air blow unit, and the distance measurement unit; and a robot controller for controlling the articulated robot, the robot controller being distinct from the main controller; and wherein the robot controller and the main controller are configured to perform cutter change by exchanging signals therebetween.

* * * * *